(12) United States Patent
Mituhashi

(10) Patent No.: US 7,139,488 B1
(45) Date of Patent: Nov. 21, 2006

(54) OPTICAL COMMUNICATION UNIT

(75) Inventor: Tomio Mituhashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/612,633

(22) Filed: Jul. 7, 2000

Related U.S. Application Data

(62) Division of application No. 09/046,558, filed on Mar. 24, 1998.

(30) Foreign Application Priority Data

Sep. 26, 1997 (JP) .................... 9-262544
Feb. 13, 1998 (JP) .................... 10-031332

(51) Int. Cl.
*H04B 10/00* (2006.01)

(52) U.S. Cl. .................... 398/129; 398/141

(58) Field of Classification Search ............ 359/152, 359/159, 189, 195; 398/141, 139, 200, 201, 398/129, 131, 156, 122, 123
See application file for complete search history.

(56) References Cited

U.S. PATENT DOCUMENTS

| | | | | |
|---|---|---|---|---|
| 4,130,738 A | * | 12/1978 | Sandstedt ............... | 398/108 |
| 4,625,333 A | * | 11/1986 | Takezawa et al. ....... | 359/113 |
| 5,307,058 A | | 4/1994 | Tokizane et al. ........ | 340/3.21 |
| 5,416,627 A | * | 5/1995 | Wilmoth .................. | 359/152 |
| 5,664,035 A | * | 9/1997 | Tsuji et al. ............... | 359/152 |
| 5,706,112 A | | 1/1998 | Morita et al. ............ | 359/142 |
| 5,742,602 A | | 4/1998 | Bennett .................... | 370/401 |
| 5,781,177 A | * | 7/1998 | Helot et al. .............. | 345/156 |
| 5,818,619 A | * | 10/1998 | Medved et al. .......... | 398/128 |
| 5,832,324 A | | 11/1998 | Shimizu et al. .......... | 396/303 |
| 5,875,047 A | * | 2/1999 | Abe et al. ................ | 359/152 |
| 5,940,209 A | * | 8/1999 | Nguyen .................... | 359/341.1 |
| 5,959,752 A | * | 9/1999 | Ota ......................... | 359/152 |
| 5,986,785 A | * | 11/1999 | Kobayashi ................ | 250/353 |

FOREIGN PATENT DOCUMENTS

| | | |
|---|---|---|
| DE | 1943738 | 3/1979 |
| DE | 22 34 445 C3 | 8/1979 |
| DE | 3231409 A1 | 3/1983 |
| DE | 31 32 256 A1 | 4/1983 |
| DE | 35 45 194 A1 | 7/1987 |
| DE | 37 16 772 A1 | 12/1988 |
| DE | 37 30 971 A1 | 3/1989 |
| DE | 37 35 138 A1 | 5/1989 |
| DE | 3924381 | 12/1990 |
| DE | 43 07 239 A1 | 12/1993 |
| DE | 195 12 206 | 3/1995 |
| DE | 195 01 539 A1 | 10/1995 |
| DE | 198 36 373 | 3/1999 |
| EP | 0311279 | 9/1988 |
| EP | 0343725 | 5/1989 |
| EP | 0483549 A2 | 5/1992 |
| EP | 0519648 | 6/1992 |

(Continued)

*Primary Examiner*—Christina Y. Leung
(74) *Attorney, Agent, or Firm*—Staas & Halsey LLP

(57) ABSTRACT

An optical communication unit has a pair of cable-side communication units provided for a full duplex communication system connected to each other with a pair of optical fiber cables, has apparatus-side communication units provided for full duplex communication system directly connected to the cable-side communication units respectively each to form a closest contact state therebetween, and provides controls for a speed to double speed in full duplex system by using an infrared ray IR between the closely contacted units.

12 Claims, 15 Drawing Sheets

FOREIGN PATENT DOCUMENTS

| | | |
|---|---|---|
| EP | 0 623 891 A2 | 11/1994 |
| JP | 59-168682 | 9/1984 |
| JP | 2-151083 | 6/1990 |
| JP | 8-161089 | 6/1996 |
| JP | 9-258072 | 10/1997 |
| JP | 10-243475 | 9/1998 |
| WO | WO 96/10878 | 4/1996 |

\* cited by examiner

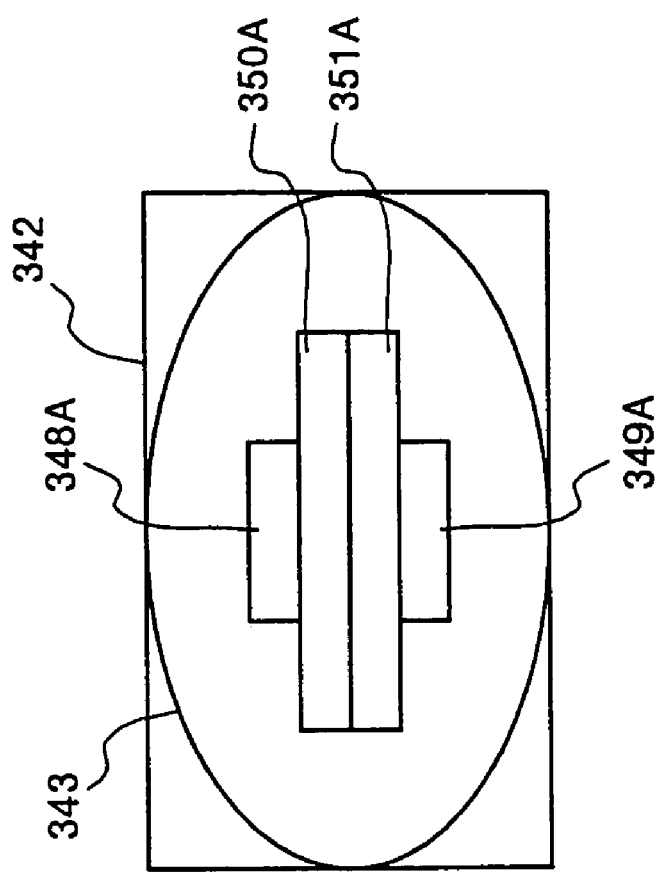
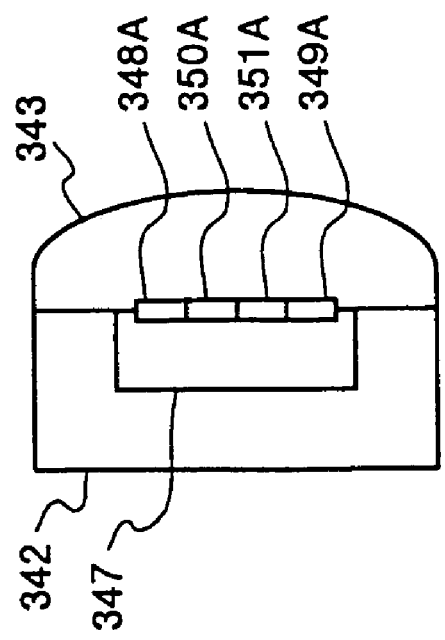

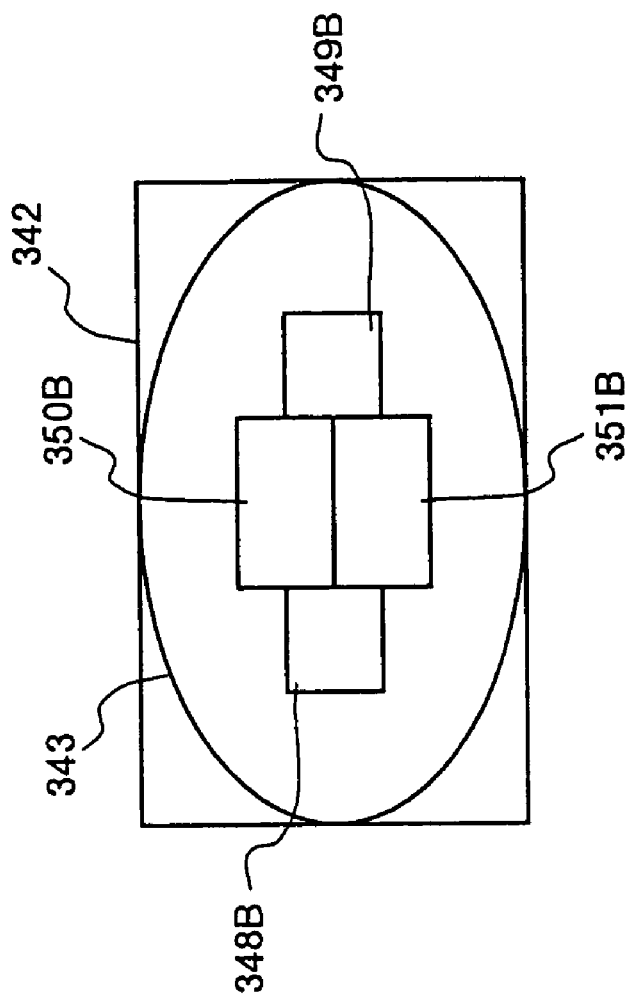
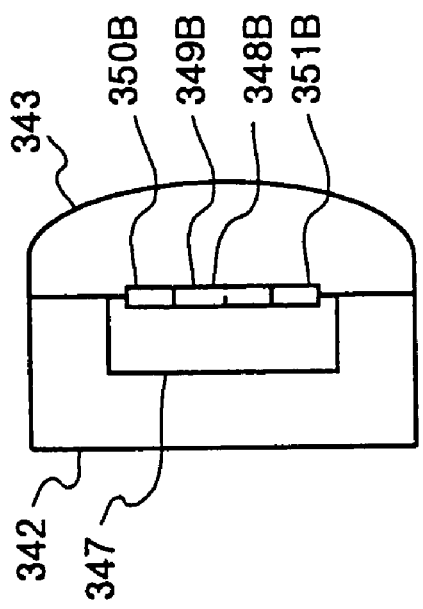
FIG.13B
FIG.13A

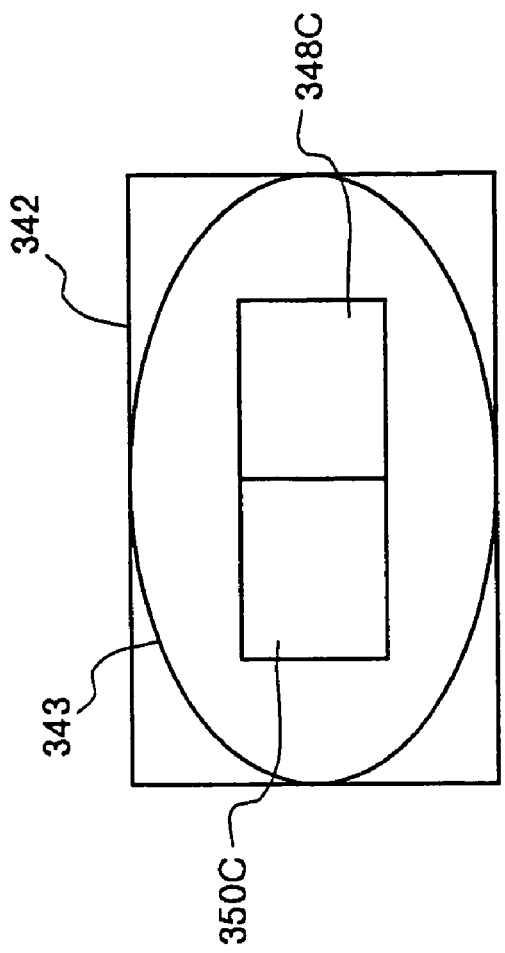
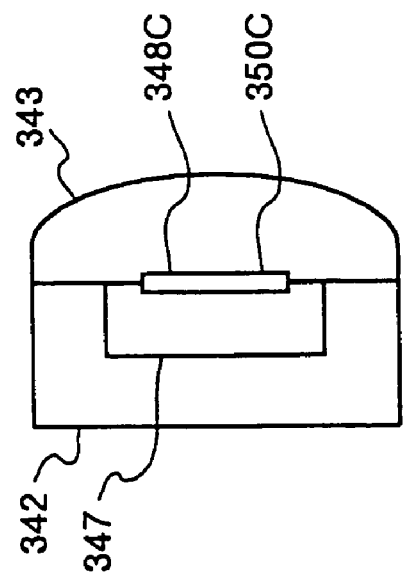
FIG.14B
FIG.14A

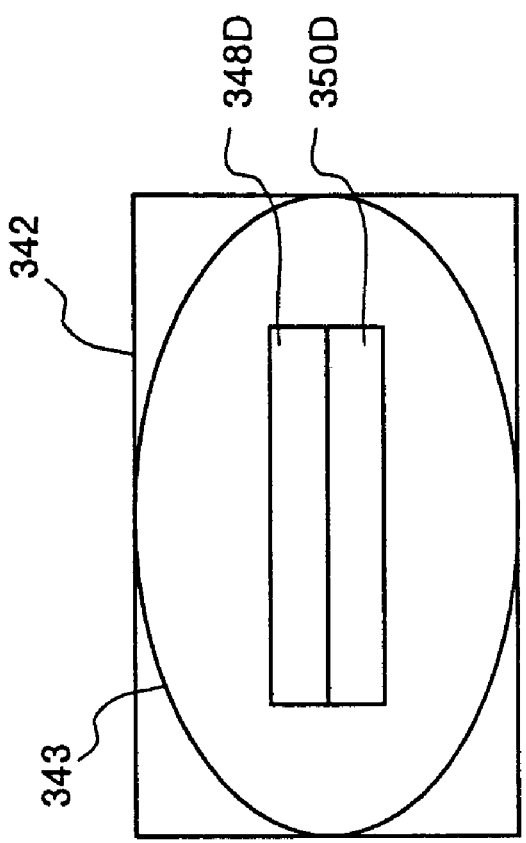
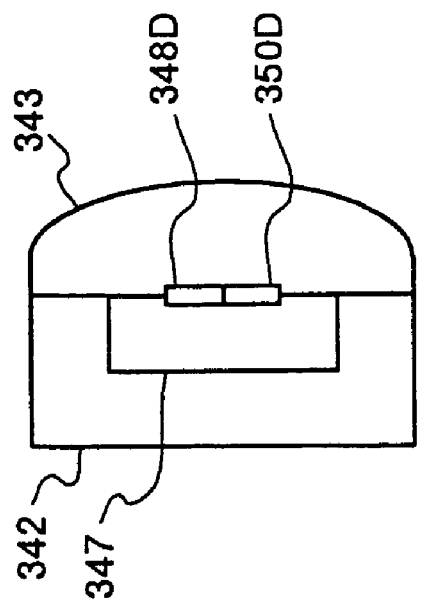
FIG.15B
FIG.15A

OPTICAL COMMUNICATION UNIT

This application is a divisional of application Ser. No. 09/046,558, filed Mar. 24, 1998, now pending.

FIELD OF THE INVENTION

The present invention relates to an optical communication unit, and more particularly to an optical communication unit for executing data communication by using an infrared ray between equipment such as personal computers or a personal computer and a printer.

BACKGROUND OF THE INVENTION

FIG. 16 is a block diagram showing an optical communication unit according to, for instance, Japanese Patent Laid-Open Publication No. HEI 8-161089. The optical communication unit shown in FIG. 16 comprises a first communication unit 71 connected to a personal computer and functioning as an optical interface, and a second communication unit 81 connected to a printer and functioning as an optical interface.

These first communication unit 71 and second communication unit 81 are arbitrarily spaced therebetween according to each place where a personal computer and a printer are installed respectively, so that a distance of the space therebetween is a distance for spatial transmission of the infrared ray.

At first, the first communication unit 71 comprises a signal converting circuit 72 for converting electric signal data outputted from a personal computer to data for transmission with an infrared ray, an LED driver 73 for driving a light emitting diode (LED) 74 emitting an infrared ray, an LED 74 emitting an infrared ray, a photodiode (PD) 75 for receiving an infrared ray emitted by the LED 84 of the second communication unit 81, a detecting circuit 76 for detecting the infrared ray received by the PD 75 and obtaining data for the infrared ray, and a signal converting circuit 77 for converting the data for the infrared ray to electric signal data and transferring the electric signal data to the personal computer.

On the other hand, the second communication unit 81 comprises a signal converting circuit 82 for converting electric signal data outputted from a printer to data for transmission with an infrared ray, an LED driver 83 for driving an LED 84 emitting an infrared ray, an LED 84 emitting an infrared ray, a photodiode 85 for receiving an infrared ray emitted by the LED 74 of the first communication unit 71, a detecting circuit 86 for detecting the infrared ray received by the PD 85 and obtaining data for the infrared ray, and a signal converting circuit 87 for converting the data for the infrared ray to electric signal data and transferring the electric signal data to the printer.

Next description is made for the operations of the optical communication unit having the configuration as described above. In the optical communication unit shown in FIG. 16, when data is printed by a printer, an output signal processed by a personal computer is received by the signal converting circuit 72, and is converted to a serial signal for optical communication. When the converted serial signal is sent to the LED driver 73, the LED driver 73 blinks the LED 74 according to the converted serial signal and emits an infrared ray.

The outputted infrared ray by means of emission by the LED 74 is received by the PD 85 in the printer. The received infrared ray is further converted, when having been detected by the detecting circuit 86, to a signal for controlling the printer in the signal converting circuit 87 provided in the following stage. The signal for controlling the printer is outputted to the printer and processing for controlling the printer is started.

It should be noted that the same processing as that from the personal computer to the printer is executed also to an infrared communication from the printer to the personal computer but in the reverse order thereof.

The conventional type of optical communication unit, however, assumes spatial transmission as a communication mode, so that optical power is adjusted for a distance of spatial transmission by about 1 m. For this reason, when communication for a short distance (e.g. 0 m), namely so-called the contact communication is executed, the light in the light receiving side is much stronger than required, so that energy loss is large in the light emitting side. Further, a transmission speed of 4 Mbps is appropriate, from a view point of efficiency of using light energy, for the spatial transmission for 1 m, but the transmission speed is too slow in the contact communication even if a balance with the optical power is taken into considerations.

SUMMARY OF THE INVENTION

It is an object of the present invention to provide an optical communication unit in which reduction of optical power and speed-up of a communication speed can be realized with the best balance therebetween by improving the efficiency of using energy for desired optical communication.

With the present invention, a driving force of a driving section which drives a light emitting section is changed in a control section according to an instruction from a switching section, which can give a change to an optical signal emitted by the light emitting section. For this reason, it is possible to improve efficiency of using energy appropriate for desired optical communication.

With the present invention, a quantity of light emitted by the light emitting section is changed as a driving force of the driving section, so that optical power can be reduced by improving efficiency of using energy appropriate for desired optical communication.

With the present invention, a transmission speed of an optical signal is changed as a driving force to the driving section, so that a communication speed can be speeded up by improving efficiency of using energy appropriate for desired optical communication.

With the present invention, the switching section gives an instruction for switching a driving force to the control section when connection to an apparatus as a destination for transmission is detected, so that ordinary optical communication is executed if the connection to the apparatus as a destination for transmission is not established, and if the connection is established, a change in a quantity of light to reduce optical power or a change in a transmission speed to speed up a communication speed can be executed.

With the present invention, the switching section gives an instruction for switching a driving force to the control section when connection between an apparatus as a destination for transmission and an optical cable unit is detected, so that ordinary optical communication is executed if the connection between the apparatus as a destination for transmission and the optical cable unit is not established, and if the connection is established, a change in a quantity of light to reduce optical power or a change in a transmission speed to speed up a communication speed is executed.

With the present invention, connection is detected and a change instruction signal is outputted to the control section by a sensor in the switching section, so that the switching section can surely obtain a timing of switching with its simple construction.

With the present invention, connection is detected and an instruction for changing a driving force is outputted to the driving section by a hardware in the switching section, so that the switching section can surely obtain a timing of switching with its simple construction.

With the present invention, an optical signal is received by a light receiving section, so that communication is not one-directional communication simply by emitting an optical signal, but duplex communication of infrared rays can be realized by receiving optical signals.

With the present invention, the light receiving section and the light emitting section are covered with a same lens, so that accuracy as duplex communication can be insured so far as a quantity of light and a transmission speed are provided under the same condition.

With the present invention, a visual light is cut off by an optical filter on a light path to the light emitting section as well as to the light receiving section, so that only an infrared ray having a frequency higher than that of the visual light is received or emitted, and for this reason, sufficient optical communication can be realized.

With the present invention, incidence of an optical signal from the light emitting section to the light receiving signal is prevented by a shielding section inside the optical communication unit provided in an apparatus for executing communication using an optical signal, so that an emitted optical signal and a received optical signal are not interfered with each other with the shielding section provided therebetween, and for this reason, sufficient duplex communication can be realized.

With the present invention, signals are transmitted to and received from an apparatus as a communicating partner via the optical cable unit, so that a distance between the apparatus and the apparatus as a communicating partner can arbitrarily be set in a state where a distance for executing optical communications through the space is kept constant.

With the present invention, a visual light is cut off by an optical filter on a light path to the light emitting section as well as to the light receiving section, so that sufficient optical communications can be realized by receiving and emitting only an infrared ray having a frequency more than that of the visual light.

With the present invention, in a signal transmitting/receiving section connected to one end of an optical cable, optical transmission between the apparatus and the optical cable is executed by the light receiving section and the light emitting section at the edge section of the connected optical cable, so that a communication timing between apparatuses can be maintained well regardless of a length of an optical cable.

With the present invention, a cable has a pair of paths for transferring optical signals in different directions respectively, so that duplex communication inside the cable can be realized.

With the present invention, an optical signal from the light emitting section is prevented by a shielding section so that the signal does not enter the light receiving section, so that an emitted optical signal and a received optical signal are not interfered with each other due to the shielding section provided therebetween, and for this reason, sufficient duplex communication can be realized.

With the present invention, an optical signal from the apparatus is converged and outputted into the optical cable by a first converging lens in the light receiving section, and an optical signal transmitted through the optical cable is converged and sent to the apparatus by a second converging lens in the light emitting section, so that only a smaller number of components in the light receiving/emitting sections is required, and for this reason, whole configuration realizing transmission and reception of optical signals can be simplified and minimized.

With the present invention, an optical signal transmitted by the apparatus is modulated or demodulated and sent into the optical cable by a first modulating/demodulating section in the light receiving section, and an optical signal transmitted via the optical cable is modulated or demodulated and sent into the apparatus by a second modulating/demodulating section in the light emitting section, so that a desired communication speed can be obtained according to arrangement of a pulse width of an optical signal sent by the apparatus for modulation and demodulation of the signal.

With the present invention, the light receiving section and the light emitting section are covered with a same lens, so that accuracy as duplex communication can be insured so far as a quantity of light and a transmission speed are provided under the same condition.

With the present invention, a circuit changing an available area thereof according to a communication speed of an optical signal is provided in the light receiving section, so that it is required only to use an area most adapted to a communication of the optical signal, and with this feature, power consumption can be made more efficient.

With the present invention, a circuit changing an available area thereof according to a transmission distance of an optical signal is provided in the light receiving section, so that it is required only to use an area most adapted to a transmission distance of the optical signal, and with this feature power consumption can be made more efficient.

With the present invention, a light receiving section and said light emitting section are integrated to each other and integrated light receiving/emitting section is covered with one piece of converging lens, so that the light receiving/emitting section is made minimized, and with this feature the entire unit can be made further smaller.

With the present invention, the light receiving section and the light emitting section comprise a single converging lens for converging an optical signal from the apparatus as well as from the optical cable, so that only a smaller number of components in the light receiving/emitting sections is required, and for this reason, the whole configuration realizing transmission and reception of optical signals can be simplified and minimized.

Other objects and features of this invention will become understood from the following description with reference to the accompanying drawings.

BRIEF DESCRIPTION OF THE DRAWINGS

FIGS. 10A and 10B are views showing an example of arrangement of a light receiving/emitting section in an optical communication unit according to Embodiment 7;

FIGS. 13A and 13B are views showing an example of arrangement of a light receiving/emitting section in an optical communication unit according to Variant 1 of Embodiment 7;

FIGS. 14A and 14B are views showing an example of arrangement of a light receiving/emitting section in an optical communication unit according to Variant 2 of Embodiment 7;

FIGS. 15A and 15B are views showing an example of arrangement of a light receiving/emitting section in an optical communication unit according to Variant 3 of Embodiment 7.

DESCRIPTION OF THE PREFERRED EMBODIMENTS

Detailed description is made hereinafter for preferred embodiments of the optical communication unit according to the present invention with reference to the accompanying drawings.

Figure 1:
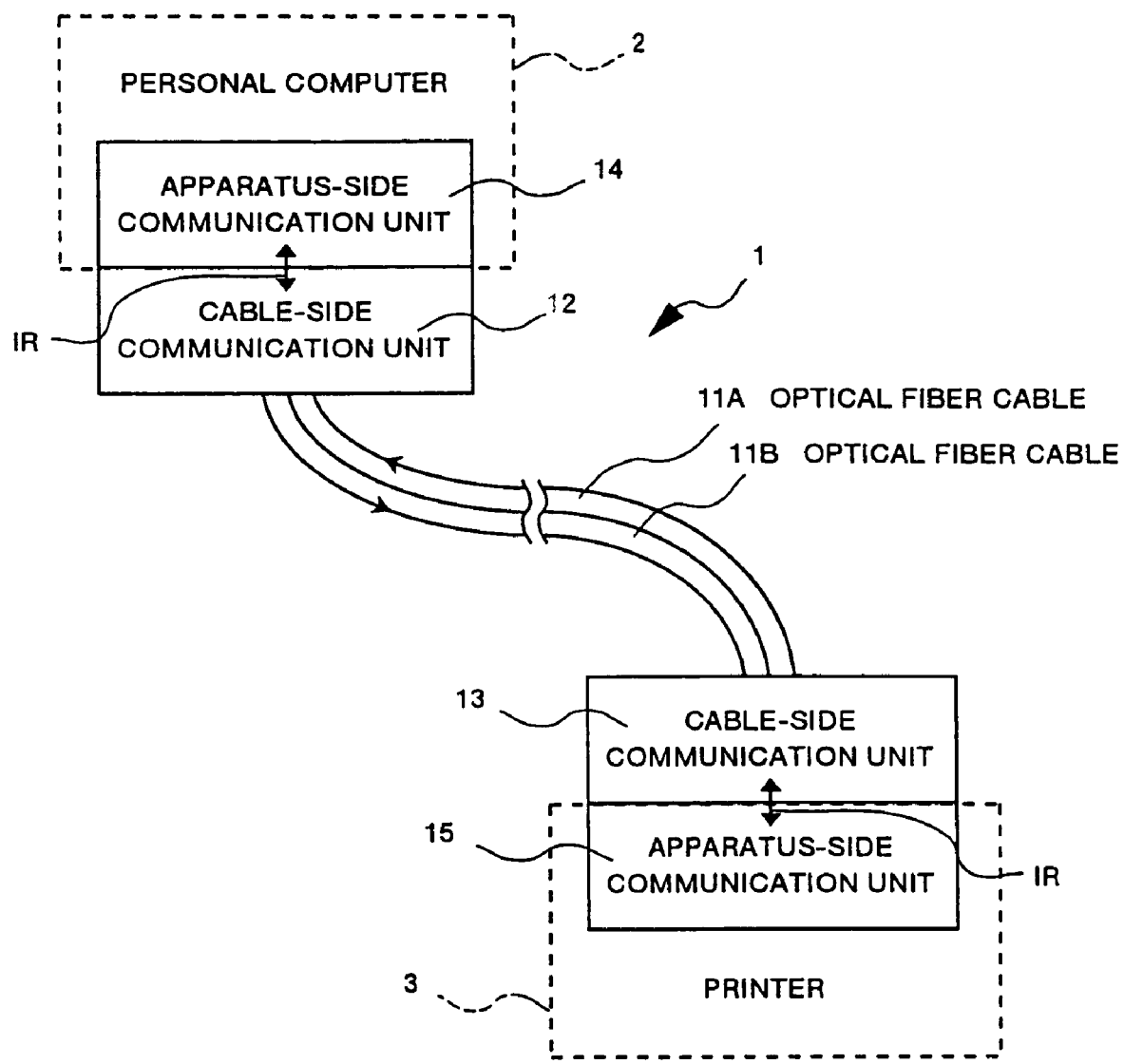
FIG. 1 is a view showing configuration of a system in which an optical communication unit according to Embodiment 1 of the present invention is applied.

At first, description is made for system configuration. FIG. 1 is a view showing configuration of a system in which an optical communication unit according to Embodiment 1 of the present invention is applied. An optical communication unit 1 according to Embodiment 1 comprises a pair of optical fiber cables 11A, 11B each as an optical cable; a pair of cable-side communication units 12, 13 each as a second communication unit for executing infrared communication and connected to each of both ends of the pair of optical fiber cables 11A, 11B, respectively; and a pair of apparatus-side communication units 14, 15 each as a first communication unit for executing infrared communication and connected to each of both ends of the pair of cable-side communication units 12, 13 respectively.

The pair of optical fiber cables 11A, 11B transmit optical signals (each obtained by converting an infrared ray to data) in two directions with one side of the cables for one direction. In Embodiment 1, one of the optical fiber cables 11A is a transmission path for transmitting an optical signal from the cable-side communication unit 13 to the cable-side communication unit 12, and the other side of the optical fiber cables 11B is a transmission path for transmitting an optical signal from the cable-side communication unit 12 to the cable-side communication unit 13.

The optical communication unit 1 shown in FIG. 10 has system configuration in which the apparatus-side communication units 14, 15 are incorporated in a printer 3 as well as in a personal computer 2 respectively, to which the cable-side communication units 12, 13 each with, a cable (optical fiber cables 11A, 11B) are directly connected respectively. In this system configuration, infrared communication is possible between the personal computer 2 and the printer 3.

Each of the cable-side communication units 12, 13 as well as of the apparatus-side communication units 14, 15 has a light emitting element for emitting an infrared ray IR and a light receiving element for receiving an infrared ray IR respectively. Each of the apparatus-side communication units 14, 15 has a converting circuit for converting a medium between an optical signal and an electric signal respectively. Each of the apparatus-side communication units 14, 15 converts a light (infrared ray) received from each of the cable-side communication units 12, 13 to an electric signal with the converting circuit and outputs the electric signal to the personal computer 2 or the printer 3, respectively. Each of the apparatus-side communication units 14, 15 also converts an electric signal received from the personal computer 2 or from the printer 3 to a light (infrared ray) with the converting circuit and sends the light to each of the cable-side communication units 12, 13 respectively.

Communications between the apparatus-side communication unit 14 and the cable-side communication unit 12, and communications between the apparatus-side communication unit 15 and the cable-side communication unit 13 are radio communications with infrared rays. A distance for signals to be spatially transmitted through infrared communication is a short distance because both of the units contact each other. Also, communications between the apparatus-side communication unit 14 and the personal computer 2 as well as between the apparatus-side communication unit 15 and the printer 3 are executed with electric signals respectively, and communications between the cable-side communication units 12 and 13 through the optical fiber cables 11A and 11B are executed with optical signals.

Figure 2:
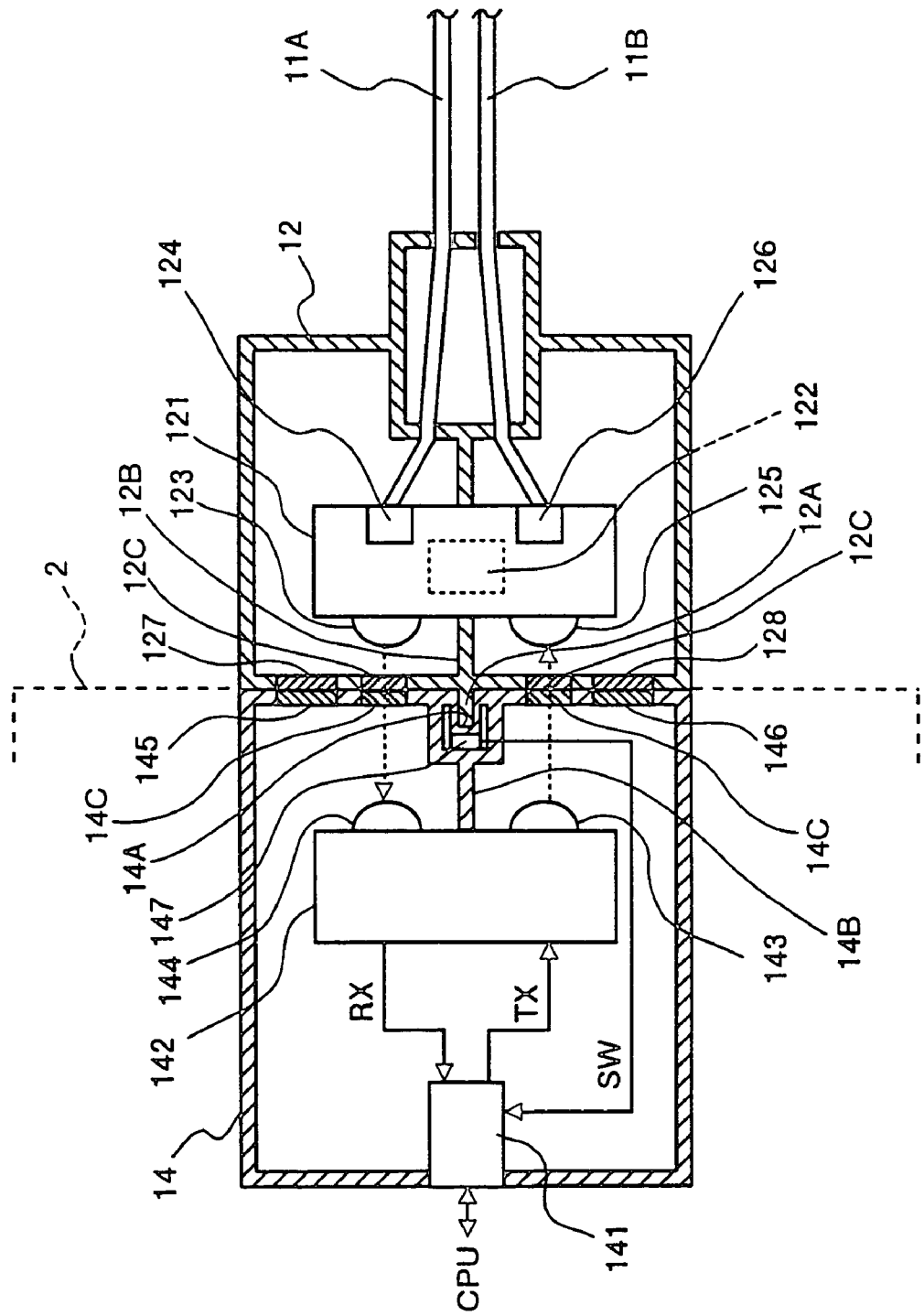
FIG. 2 is a cross-sectional view showing internal configuration of the optical communication unit according to Embodiment 1 of the present invention.

Next description is made for internal configuration of each of the communication units. FIG. 2 is a cross-sectional view showing internal configuration of the optical communication unit according to Embodiment 1 of the present invention. It should be noted that the cable-side communication units 12 and 13 have the same configuration as each other, so that description is made hereinafter for the cable-side communication unit 12 as an example thereof. Similarly, the apparatus-side communication units 14 and 15 have the same configuration as each other, so that description is made hereinafter for the apparatus-side communication unit 14 as an example thereof.

The cable-side communication unit 12 has a frame thereof formed in a box form, and an optical module 121 connected to ends of the optical fiber cables 11A and 11B provided inside the frame. The optical module 121 has an LSI 122 for executing infrared communications with the apparatus-side communication unit 14 as well as with the other side of cable-side communication unit 13 provided inside the module. Optical filters 12C for cutting off a visual light of an optical signal and letting pass therethrough only an infrared ray having a frequency higher than that of the visual light are provided on the contact surface with the apparatus-side communication unit 14 which is a communication unit as a partner in the frame of the cable-side communication unit 12.

Provided on the contact surface are magnets 127 and 128 in adjacent to the optical filters 12C respectively. Those magnets 127, 128 are used for being magnetically connected to metallic portions provided on the contact surface of the apparatus-side communication unit 14 as a partner.

Incorporated in the optical module 121 are an LED chip 124 as a light emitting element and a PD chip 126 as a light receiving element. More specifically, the optical fiber cable 11A is connected to the LED chip 124, and the optical fiber cable 11B is connected to the PD chip 126. Provided at positions opposite to the optical filters 12C in the optical module 121 are also an LED lens 123 for light emission by the LED chip 124 and a PD lens 125 for receiving a light by the PD chip 126.

Provided in a space area in the cable-side communication unit 12 where the LED lens 123 and the PD lens 125 for the optical module 121 are present is a shielding plate 12B for optically shielding a light (infrared ray) emitted from the LED lens 123 against a light (infrared ray) received by the PD lens 125. This shielding plate 12B is provided for realizing simultaneous optical communications in two directions, namely full duplex communication.

Provided on a portion of the contact surface which the shielding plate 12B strikes is a projecting section 12A in the cable-side communication unit 12. This projecting section 12A is a portion for engaging a concave section 14A provided on the contact surface of the apparatus-side communication unit 14 as a partner.

The apparatus-side communication unit 14 has a frame thereof formed in a box form. An LSI 141 electrically connected to the CPU of the personal computer 2 and an optical module 142 electrically connected to this LSI 141 are provided inside the frame. The LSI 141 provides controls for double speed communications in a state where the communication unit 14 is connected to the cable-side communication unit 12 as a partner. The optical module 142 has an LSI (not shown in the figure) for executing infrared communications with the apparatus-side communication unit 14 as well as with the other side of cable-side communication unit 13 provided inside the module.

Provided on the contact surface with the cable-side communication unit 12 which is a communication unit as a partner in the frame of the apparatus-side communication unit 14 are optical filters 14C each for cutting off a visual light of an optical signal and letting pass therethrough only an infrared ray having a frequency higher than that of the visual light. Provided in adjacent to the optical filters 14C on the contact surface are also iron plate members 145 and 146 respectively to which the magnets 127 and 128 of the cable-side communication unit 12 as a partner are connected respectively.

Incorporated in the optical module 142 are an LED chip as a light emitting element and a PD chip as a light receiving element which are not shown in the figure, and an LED lens 143 for light emission by the LED chip and a PD lens 144 for receiving a light by the PD chip are provided therein opposite to the optical filters 14C respectively.

In the apparatus-side communication unit 14, provided in a space area where the LED lens 143 and the PD lens 144 for the optical module 142 are present is a shielding plate 14B for optically shielding a light (infrared ray) emitted from the LED lens 143 against a light (infrared ray) received by the PD lens 144. This shielding plate 14B is provided for realizing simultaneous optical communications in two directions, namely full duplex communication. In the apparatus-side communication unit 14, the concave section 14A for being engaged by the projecting section 12A of the cable-side communication unit 12 as a partner is provided on a portion of the contact surface which the shielding plate 14B contacts.

Further, a switch circuit for detecting connection between engaged units is provided in the engaged section between the projecting section 12A and the concave section 14A. Namely, this switch circuit is a double speed mode switch 147 for switching to a double speed mode to execute double speed infrared communication when the cable-side communication unit 12 and the apparatus-side communication unit 14 are connected to each other. It should be noted that this double speed mode switch 147 switches, if the connection is not detected, to an ordinary mode for infrared communication assuming ordinary spatial transmission (1 m).

It should be noted that the double speed mode switch 147 is used, in the strict sense, for detecting the connection, and for this reason a switch signal SW obtained by detecting the connection is supplied to the LSI 141. Accordingly, a unit for actually controlling operations in the double speed mode or in the ordinary mode is the LSI 141.

Signal lines for sending transmitting/receiving signals therethrough are provided in a space between the LSI 141 and the optical module 142. Sent through the signal lines are a receiving signal RX from the optical module 142 to the LSI 141 and an transmitting signal TX from the LSI 141 to the optical module 142.

Figure 3:
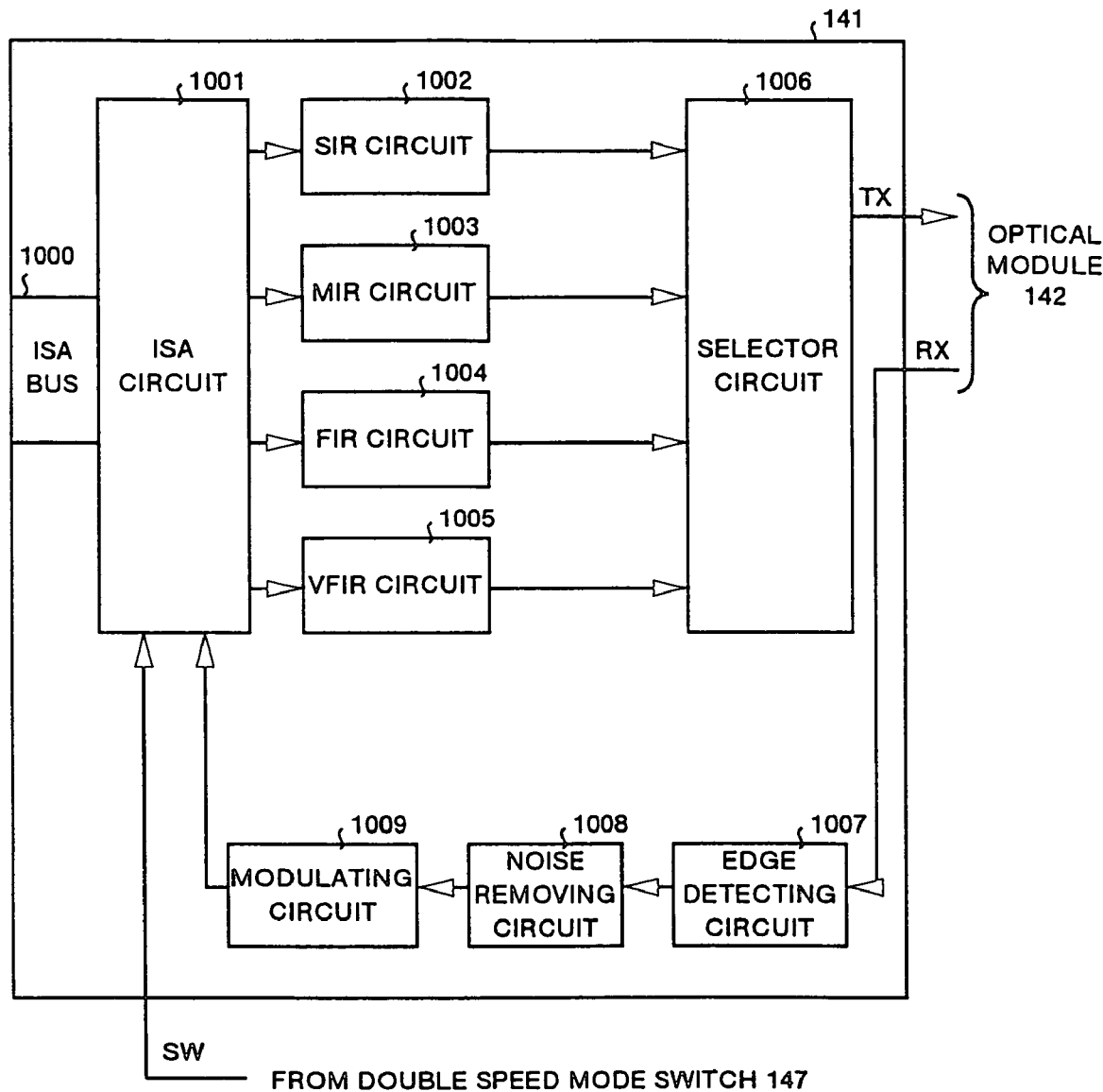
FIG. 3 is a block diagram showing internal configuration of an LSI in an apparatus-side communication unit.
Figure 4:
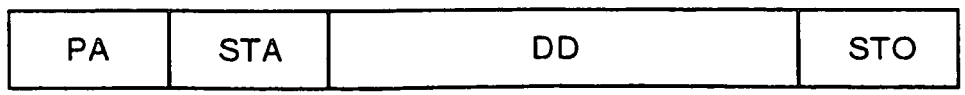
FIG. 4 is a view showing one example of a data format used for infrared communication according to Embodiment 1 of the present invention.

Next description is made for configuration of the LSI. FIG. 3 is a block diagram showing internal configuration of the LSI 141 in the apparatus-side communication unit shown in FIG. 2, and FIG. 4 is a view showing one example of a data format used for infrared communication according to Embodiment 1 of the present invention. The LSI 141 shown in FIG. 3 comprises an ISA (Industry Standard Architecture) bus 1000, an ISA circuit 1001, an SIR (Standard InfraRed) circuit 1002, an MIR (Medium InfraRed) circuit 1003, an FIR (First InfraRed) circuit 1004, a VFIR (Very First Infra-Red) circuit 1005, a selector circuit 1006, an edge detecting circuit 1007, a noise removing circuit 1008, and a demodulating circuit 1009.

The ISA bus 1000 operates at a communication speed of 8 MHz, and manages interface with the CPU of a personal computer 2. The ISA circuit 1001 provides, when transmitting/receiving an infrared ray, controls for a communication speed of the ISA bus 1000 at an ordinary speed or at a double speed according to a switch signal from the double speed mode switch 147 (a double speed mode indicates a VFIR mode, and an ordinary speed mode indicates SIR, MIR, and FIR modes).

The SIR circuit 1002 is a transmitting circuit for controlling a pulse width of transmission data to $3/16$ according to a UART (Universal Asynchronous Receiver/Transmitter) mode. For example, infrared communications can be executed at a baud rate as far as 115.2 kbps in an IrDA (Infrared Data Association) 1.0 SIR mode. More specifically, this SIR circuit 1002 is used when an ordinary mode is selected and controls a communication speed in the mode to a range from 2.4 kbps to 115.2 kbps.

The MIR circuit 1003 is a transmitting circuit for controlling a pulse width of transmission data to $1/4$ according to an HDLC (High-Level Data Link Control) mode. This MIR circuit 1003 has a function for generating a check bit/check code. This MIR circuit 1003 is used when an ordinary mode is selected and controls a communication speed in the mode to a range from 0.576 Mbps to 1.152 Mbps. The FIR circuit 1004 has functions for converting transmission data from 2-bit data to 4-bit data according to a 4 PPM (four-value Pulse Position Modulation) data stream and generating a check bit/check code. This FIR circuit 1004 is used when an ordinary mode is selected and controls a communication speed in the mode to 4 Mbps.

The VFIR circuit 1005 has functions for converting transmission data from 4-bit data to 5-bit data and generating a check bit/check code. This VFIR circuit 1005 is used when a double speed mode is selected and controls a communication speed in the mode to 10 Mbps. The selector circuit 1006 selects transmission data having a data length of any of the SIR circuit 1002, MIR circuit 1003, FIR circuit 1004, or VFIR circuit 1005 according to controls by the ISA circuit 1001 and sends the data to the optical module 142 provided in the following stage.

The edge detecting circuit 1007 is connected to the optical module 142 and detects an incoming infrared ray emitted from the cable-side communication unit 12 as a partner according to a signal outputted from the optical module 142. The noise removing circuit 1008 remove noises (infrared signals generated within a short period of time) from the infrared signal detected by the edge detecting circuit 1007. The modulating circuit 1009 encodes data by widening a pulse width of received data contrary to the decoding function by each of transmitting circuit such as the SIR, MIR, FIR and VFIR.

A frame format of transmission data used for infrared communication in the ordinary mode and double speed mode comprises, as shown in FIG. 4, a preamble (PA), a start flag (STA), data (DD) and a stop flag (STO).

For example, when transmission is executed in the ordinary mode at a 4-Mbps transmission rate, in the FIR circuit 1004, at first, CRC 32 computing (generation of a check bit/check code) is executed to a frame transferred from an IrLAP layer, and the CRC 32 is added to the end of the IrLAP frame.

Then, encoding of the frame with the 4 PPM is executed, and then a preamble (PA) field and a start flag (STA) field are added to the transmission data in the order from the header thereof. Further, a stop flag (STO) field is added to the end of the frame (after a data (DD) field), and the transmission data is completed. The transmission data generated in the FIR circuit 1004 as described above is sent to the optical module 142 via the selector circuit 1006 provided in the following stage and transmitted at the ordinary speed.

Also, when transmission is executed in the double speed mode at a 10-Mbps transmission rate, in the VFIR circuit 1005, at first, CRC 32 computing (generation of a check bit/check code) is executed to a frame transferred from the IrLAP layer, and the CRC 32 is added to the end of the IrLAP frame.

Then, the transmission data is converted from 4-bit data to 5-bit data, and then a preamble (PA) field and a start flag (STA) field are added to the transmission data in the order from the header thereof. Further, a stop flag (STO) field is added to the end of the frame (after a data (DD) field), and the transmission data is completed. The transmission data generated in the VFIR circuit 1005 as described above is sent to the optical module 142 via the selector circuit 1006 provided in the following stage and transmitted at the double speed.

In receiving operations, encoding which is reverse to decoding in transmission is executed in the LSI 141, so that description thereof is omitted herein.

Next description is made for the operations of infrared communications between the personal computer 2 and the printer 3 with reference to FIG. 1 and FIG. 2. At first, to set up an environment for communications, the cable-side communication unit 12 is connected to the apparatus-side communication unit 14 of the personal computer 2, and the cable-side communication unit 13 is connected to the apparatus-side communication unit 15 of the printer 3. For the connection, it is easier to decide a position for engagement of the projecting section 12A in the concave section 14A by correlating the iron-plate members 145, 146 of the apparatus-side communication unit 14 to the magnets 127, 128 of the cable-side communication unit 12 respectively for coupling.

The double speed mode switch 147 for each of the apparatus-side communication units 14, 15 sends, when having detected connection between the units, a switch signal SW for switching from the ordinary mode to the double speed mode to the LSI 141. With this operation, the LSI 141 switches the transmission mode to the double speed mode. Namely, the 10-Mbps transmission rate by means of the VFIR circuit 1005 is used by setting the double speed mode.

When printing data is to be sent from the personal computer 2 to the printer 3, an output signal prepared in the personal computer 2 is outputted to the LSI 141. In this LSI 141, the transmission data TX (Refer to the frame format shown in FIG. 4) is generated, converted to a serial signal for optical communication, and is sent to the optical module 142. The optical module 142 emits an infrared ray from the LED lens 143 according to the transmission data TX received by the LSI 141.

A visual light of the light emitted from the LED lens 143 is cut off via the optical filters 14C, 12C for the communication units 14, 12, and for this reason the infrared ray is surely received by the PD lens 125 of the communication unit (cable-side communication unit 12) as a partner. The infrared ray received by the PD lens 125 is sent to the optical fiber cable 11B by the PD chip 126 in the optical module 121. With those operations, an infrared optical signal is sent to the other side of the cable-side communication unit 13 via the optical fiber cable 11B.

This communication unit 13 for a cable starts an operation for emitting an infrared ray to the apparatus-side communication unit 15 (printer 3) as a partner. Namely, the optical module of the cable-side communication unit 13 emits an infrared ray from the LED lens by the LED chip. Then, the apparatus-side communication unit 15 converts, when having received the infrared ray from the PD lens, the infrared optical signal to an electric signal in the optical module thereof, and the converted signal is demodulated by the LSI provided in the following stage. Then, the printer 3 receives the signal demodulated as described above as a signal for printer control and starts controlling the printer.

It should be noted that the same processing as that of the infrared communication from the personal computer 2 to the printer 3 is executed for the infrared communication from the printer 3 to the personal computer 2 in reverse order thereof. Full duplex communication is employed in Embodiment 1, and optical separation can be achieved with the shielding plates 12B and 14B, and for this reason, simultaneous optical communications in two directions between the printer 3 and the personal computer 2 can be realized.

As described above, in Embodiment 1, a pair of cable-side communication units are connected to each other through optical fiber cables, and infrared communications between units each in which the cable-side communication unit and an apparatus-side communication unit are directly connected to each other is controlled to a double speed based on the full duplex system, so that distant communication with an optical fiber cable having a length of than 100 m or more is possible regardless of a length of the optical fiber cable enabling high-speed optical communication, and it is also possible to realize contact communication based on the full duplex system between the communication units separated by a specified short distance.

For this reason, there occurs no loss of optical power required for infrared communication in the case of spatial transmission based on the contact communication, so that optical power is sufficient only with energy suitable for the contact communication. Accordingly, it is possible to realize reduction of optical power of the LED and increase of a communication speed (e.g. 10 Mbps) with the best balance therebetween by improving the efficiency in use of energy appropriate for desired optical communication based on the full duplex system. With this contact communication which can insure sufficient receiving capability, it is fully possible to realize a speed more than twice as much as the highest speed realized by the conventional technology. As a communication speed of 10 Mbps can be obtained, connection to the 10-Mbps class Ethernet becomes possible.

It should be noted that, if a switch mechanism with which a user can arbitrarily select an ordinary mode or a double speed mode is provided discretely other than the double speed mode switch 147, the ordinary mode can be operated even if the connection between communication units is established, and in this case, a function of reducing power for suppressing current consumption of the LED can be realized in night communications.

As a shielding plate is located between a light emitting element and a light receiving element, there is no possibility that an infrared ray sent from the light emitting element and that received by the light receiving element interfere each other because of the presence of the shielding plate therebetween. With this feature, sufficient infrared communications based on the full duplex system can be realized.

As optical communications through optical fiber cables are controlled by a pair of cable-side communication units themselves, a communication timing between the pair of cable-side communication units can be maintained in a good condition regardless of the length of the optical fiber cable.

As a visual light is cut off on a light path of an infrared ray from the light emitting element and by the light receiving element with an optical filter in the optical module, only an infrared ray having a frequency more than that of the visual light is received or emitted, and for this reason, sufficient optical communications can be realized.

An apparatus-side communication unit and a cable-side communication unit are connected to each other with an engagement structure, a positional relation when the apparatus-side communication unit and the cable-side communication unit are connected to each other is constant, so that infrared communications can be realized at a specified distance at any time for spatial transmission.

As the apparatus-side communication unit and the cable-side communication unit are connected to each other further with a magnetic power, so that temporary connection can easily be formed before the engagement, and for this reason operability for connection can be improved.

When the apparatus-side communication unit and the cable-side communication unit are not connected to each other, the ordinary infrared communication is executed as ordinary infrared communication (spatial transmission) in which a distance for spatial transmission is within 1 m, and on the other hand, when the cable-side communication unit is connected to the apparatus-side communication unit, the infrared communication under control for a double speed is executed as contact communication. And for this reason, infrared communication can automatically be switched to an ordinary speed mode or a double speed communication mode according to the connection between the apparatus-side communication unit and the cable-side communication unit.

Also, it is possible to apply a hardware switch such as a double speed mode switch 147 or a whole sensor switch using magnetic detection in a switching structure of providing controls for an ordinary speed or for a double speed.

Although description has been made for the full duplex system of infrared communications in Embodiment 1, like Embodiment 2 described below, the present invention is applicable to infrared communications based on a half-duplex system. It should be noted that the whole configuration thereof is the same as that in Embodiment 1 (Refer to FIG. 1), so that description is made hereinafter only for different points from the configuration in Embodiment 1.

Figure 5:
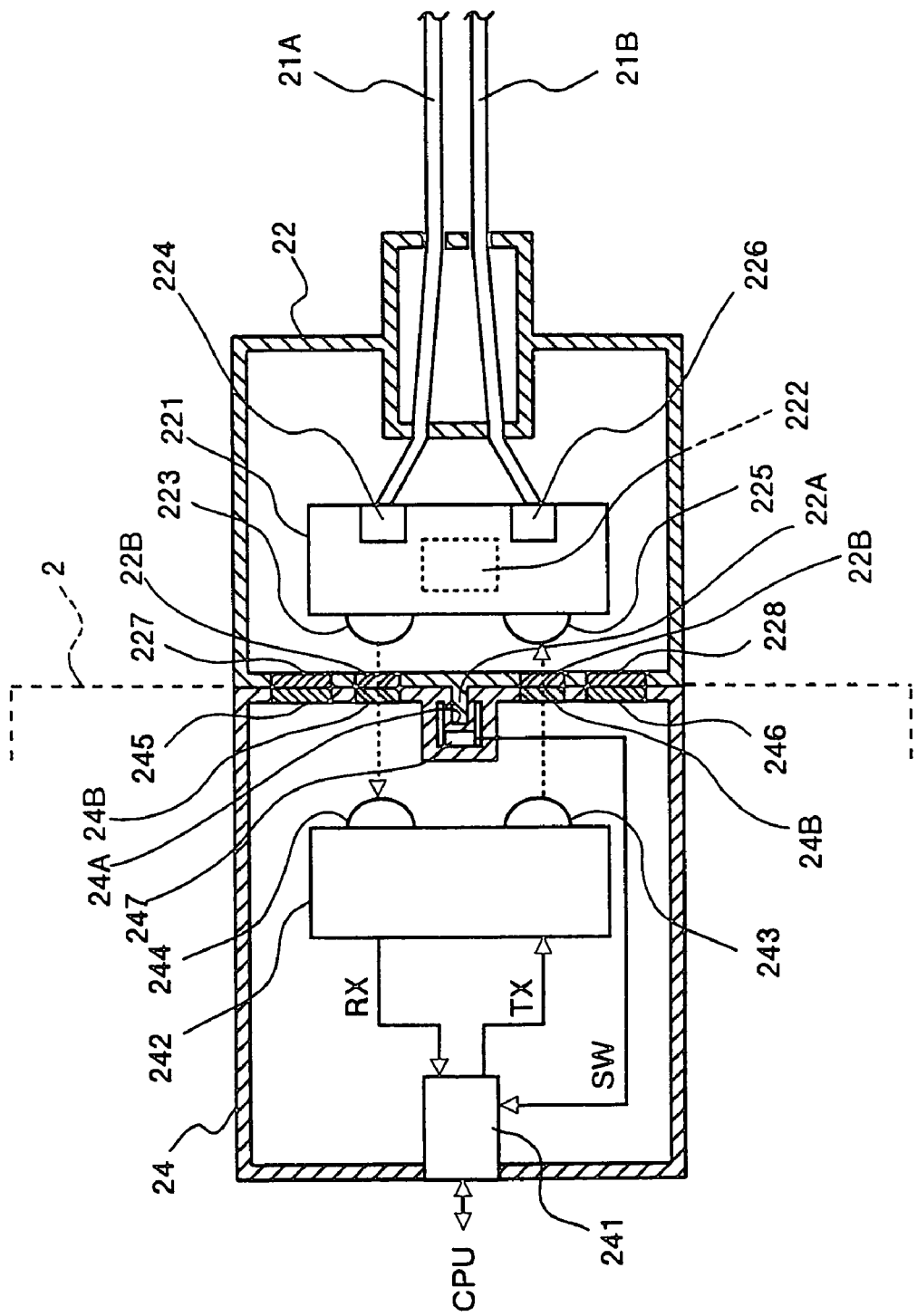
FIG. 5 is a cross-sectional view showing internal configuration of an optical communication unit according to Embodiment 2 of the present invention.

Description is made only for internal configuration of each of communication units in Embodiment 2. FIG. 5 is a cross-sectional view showing internal configuration of an optical communication unit according to Embodiment 2 of the present invention. The description herein also assumes an example of connection between a cable-side communication unit and an apparatus-side communication unit in the personal computer 2.

A cable-side communication unit 22 has a frame thereof formed in a box form, and an optical module 221 connected to one ends of optical fiber cables 21A and 21B provided inside the frame. The optical module 221 has an LSI 222 for executing infrared communications with an apparatus-side communication unit 24 as well as with the other side of cable-side communication unit provided inside the module. Optical filters 22B for cutting off a visual light of an optical signal and letting pass therethrough only an infrared ray having a frequency higher than that of the visual light are provided on the contact surface with the apparatus-side communication unit 24 as a partner in the frame of the cable-side communication unit 22.

Provided on the contact surface are magnets 227 and 228 in adjacent to the optical filters 22B respectively. Those magnets 227, 228 are used for being magnetically connected to metallic portions provided on the contact surface of the apparatus-side communication unit 24 as a partner.

Incorporated in the optical module 221 are an LED chip 224 as a light emitting element and a PD chip 226 as a light receiving element. More specifically, an optical fiber cable 21A is connected to the LED chip 224, and an optical fiber cable 21B is connected to the PD chip 226. Provided at positions opposite to the optical filters 22B in the optical module 221 are also an LED lens 223 for light by the LED chip 224 and a PD lens 225 for receiving a light by the PD chip 226.

In Embodiment 2, there is not provided in the cable-side communication unit 22 a shielding plate for optically shielding a light (infrared ray) emitted from the LED lens 223 against alight (infrared ray) received by the PD lens 225. As described above, the unit has no shielding plate provided therein, which enables realization of optical communications in two directions each for one-directional communication, namely half-duplex communication.

Provided on the same position (contact surface) as that where the projecting section 12A is provided in Embodiment 1 is a projecting section 22A having the same function in the cable-side communication unit 22. This projecting section 22A is a portion for engaging a concave section 24A provided on the contact surface of the apparatus-side communication unit 24 as a partner.

The apparatus-side communication unit 24 has a frame thereof formed in a box form. An LSI 241 electrically connected to the CPU of the personal computer 2 and an optical module 242 electrically connected to this LSI 241 are provided inside the frame. The LSI 241 provides controls for double speed communications in a state where the communication unit 24 is connected to the cable-side communication unit 22 as a partner. The optical module 242 has an LSI (not shown in the figure) for executing infrared communications with the apparatus-side communication unit 24 as well as with the other side of cable-side communication unit provided inside the module.

Optical filters 24B for cutting off a visual light of an optical signal and letting pass therethrough only an infrared ray having a frequency higher than that of the visual light are provided on the contact surface with the cable-side communication unit 22 which is a communication unit as a partner in the frame of the apparatus-side communication unit 24. Provided in adjacent to the optical filters 24B on the contact surface are also iron plate members 245 and 246 respectively to which the magnets 227 and 228 of the cable-side communication unit 22 as a partner are connected respectively.

Incorporated in the optical module 242 are an LED chip as a light emitting element and a PD chip as a light receiving element which are not shown in the figure, and an LED lens 243 for light emission by the LED chip and a PD lens 244 for receiving a light by the PD chip are provided therein opposite to the optical filters 24B respectively.

In the apparatus-side communication unit 24, there is not provided a shielding plate for optically shielding a light (infrared ray) emitted from the LED lens 243 against a light (infrared ray) received by the PD lens 244 as that in Embodiment 1 in a space area where the LED lens 243 and the PD lens 244 for the optical module 242 are present. As described above, there is no shielding plate provided therein, which enables realization of optical communications in two directions each for one-directional communication, namely half-duplex communication. Then, in the apparatus-side communication unit 24, the concave section 24A for being engaged by the projecting section 22A of the cable-side communication unit 22 as a partner is provided at a position where the concave section 14A is provided in Embodiment 1.

Further, a switch circuit for detecting connection between engaged units is provided in the engaged section between the projecting section 22A and the concave section 24A. Namely, this switch circuit is a double speed mode switch 247 for switching to a double speed mode to execute double speed infrared communication when the cable-side communication unit 22 and the apparatus-side communication unit 24 are connected to each other. It should be noted that this double speed mode switch 247 switches, if the connection is not detected, to an ordinary mode for infrared communication assuming ordinary spatial transmission (1 m).

It should be noted that the double speed mode switch 247 is used, in the strict sense, for detecting the connection, and for this reason a switch signal SW obtained by detecting the connection is supplied to the LSI 241. Accordingly, a unit for actually controlling operations in the double speed mode or in the ordinary mode is the LSI 241.

Signal lines for sending transmitting/receiving signals therethrough are provided in a space between the LSI 241 and the optical module 242. Sent through the signal lines are a receiving signal RX from the optical module 242 to the LSI 241 and a transmitting signal TX from the LSI 241 to the optical module 242. It should be noted that the LSI 241 provides controls for infrared communications in a half-duplex system.

The optical communication unit according to Embodiment 2 executes half-duplex communication, so that the need for a shielding plate for optically separating lights from each other is eliminated as far as the configuration is concerned, but the operations are executed in the same manner as that in Embodiment 1, and when communications between the apparatus-side communication unit and the cable-side communication unit are executed in two directions, infrared communications are executed based on the half-duplex system where transmission is executed in one direction and reception is executed in the other direction.

As described above, with Embodiment 2, a pair of second communication units are connected to each other through optical fiber cables, and infrared communications between units each in which the second communication unit and a first communication unit are directly connected to each other are controlled to a double speed based on the half-duplex system, so that contact communication based on the half-duplex system with a specified short distance between the communication units can be realized regardless of the length of the optical fiber cable, which enables high-speed optical communication.

For this reason, optical power for executing infrared communication is sufficient only with energy suitable for the contact communication, so that it is possible to realize reduction of optical power and speed-up of a communication speed with the best balance therebetween by improving the efficiency of using energy appropriate for contact communication based on the half-duplex system.

Although description has been made for the example of the configuration in which the LED and the PD are separated from each other to execute infrared communication in the half-duplex system in Embodiment 2, like Embodiment 3 described below, the present invention is applicable to configuration in which an LED and a PD are integrated in infrared communication in the half-duplex system. It should be noted that the whole configuration thereof is the same as that in Embodiment 1 (Refer to FIG. 1), so that description is made hereinafter only for different points from the configuration in Embodiment 1.

Figure 6:
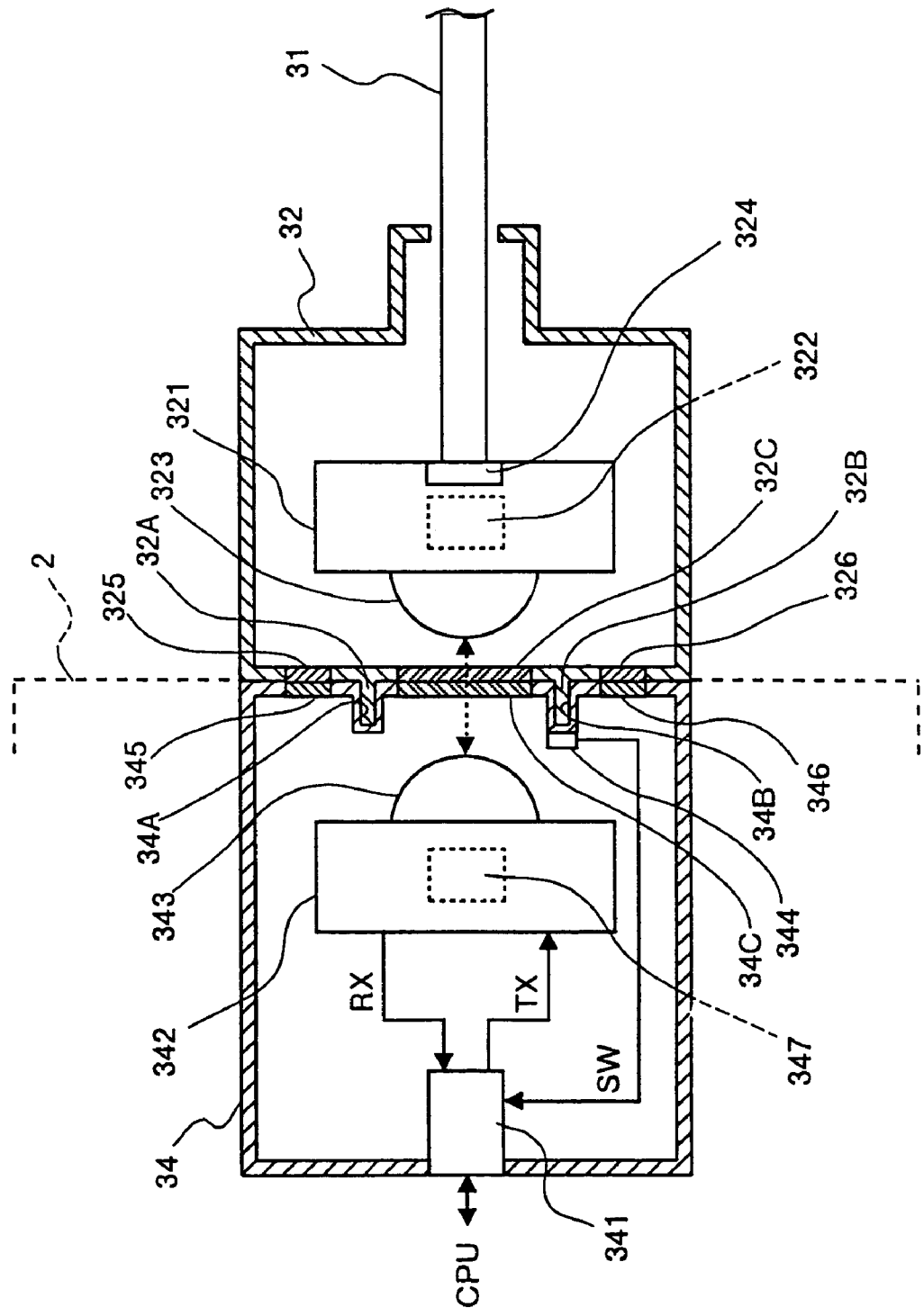
FIG. 6 is a cross-sectional view showing internal configuration of an optical communication unit according to Embodiment 3 of the present invention.

Description is made only for internal configuration of each of communication units in Embodiment 3. FIG. 6 is a cross-sectional view showing internal configuration of an optical communication unit according to Embodiment 3 of the present invention. The description herein also assumes an example of connection between a cable-side communication unit and an apparatus-side communication unit in the personal computer 2.

A cable-side communication unit 32 has a frame thereof formed in a box form, and an optical module 321 connected to one end of an optical fiber cable 31 provided inside the frame. The optical module 321 has an LSI 322 for executing infrared communications with an apparatus-side communication unit 34 as well as with the other side of cable-side communication unit provided inside the module. An optical filter 32C for cutting off a visual light of an optical signal and letting pass therethrough only an infrared ray having a frequency higher than that of the visual light is provided on the contact surface with the apparatus-side communication unit 34 which is a communication unit as a partner in the frame of the cable-side communication unit 32.

Provided on the contact surface are magnets 325 and 326 each next to the optical filter 32C respectively. Those magnets 325, 326 are used for being magnetically connected to metallic portions provided on the contact surface of the apparatus-side communication unit 34 as a partner.

Incorporated in the optical module 321 is a light receiving/emitting chip 324 obtained by integrating an LED chip as a light emitting element and a PD chip as a light receiving element. The optical fiber cable 31 is connected to this light receiving/emitting chip 324. Also, a lens 323 for receiving/emitting a light is provided at a position opposite to the optical filter 32C in the optical module 321.

In Embodiment 3, like in Embodiment 2, there is not provided in the cable-side communication unit 32 a shielding plate for optically shielding a light (infrared ray) received or emitted by the light receiving/emitting lens 323. As described above, the unit has no shielding plate provided therein, which enables realization of optical communications in two directions each for one-directional communication, namely half-duplex communication.

In the cable-side communication unit 32, different from the position where the projecting section 12A is provided in Embodiment 1, projecting sections 32A, 32B are provided at only two places adjacent to the periphery of the light receiving/emitting lens 323. Those projecting sections 32A, 32B are portions for engaging concave sections 34A, 34B respectively provided on the contact surface of the apparatus-side communication unit 34 as a partner.

The apparatus-side communication unit 34 has a frame thereof formed in a box form. An LSI 341 electrically connected to the CPU of the personal computer 2 and an optical module 342 electrically connected to this LSI 341 are provided inside the frame. The LSI 341 provides controls for double speed communications in a state of connection of the communication unit 34 to the cable-side communication unit 32 as a partner. The optical module 342 has an LSI 347 for functioning infrared communications with the apparatus-side communication unit 34 as well as with the other side of cable-side communication unit provided inside the module.

An optical filter 34C for cutting off a visual light of an optical signal and letting pass therethrough only an infrared ray having a frequency higher than that of the visual light is provided on the contact surface with the cable-side communication unit 32 which is a communication unit as a partner in the frame of the apparatus-side communication unit 34. Provided in adjacent to the optical filter 34C on the contact surface are also iron plate members 345 and 346 to which the magnets 325 and 326 of the cable-side communication unit 32 as a partner are connected respectively.

Incorporated in the optical module 342 is a light receiving/emitting chip, which is not shown in the figure, obtained by integrating an LED chip as a light emitting element and a PD chip as a light receiving element, and also a lens 343 for receiving/emitting a light is provided at a position opposite to the optical filter 34C therein.

In the apparatus-side communication unit 34, there is not provided a shielding plate for optically shielding lights (infrared ray) received/emitted by the receiving/emitting lens 343 against each other as that in Embodiment 1 in a space area where the receiving/emitting lens 343 for the optical module 342 is present. As described above, there is no shielding plate provided therein, which enables realization of optical communications in two directions each for one-directional communication, namely half-duplex communication. Then, in the apparatus-side communication unit 34, concave sections 34A, 34B for being engaged by the projecting sections 32A, 32B respectively are provided according to a positional relation between the projecting sections 32A, 32B located in the cable-side communication unit 32 as a partner which are different from the position where the concave section 14A is provided in Embodiment 1.

Further, a switch circuit for detecting connection between engaged units is provided in either one of the engaged sections between the projecting sections 32A, 32B and the concave sections 34A, 34B. Namely, this switch circuit is a double speed mode switch 344 for switching to a double speed mode to execute double-speed infrared communication when the cable-side communication unit 32 and the apparatus-side communication unit 34 are connected to each other. It should be noted that this double speed mode switch 344 switches, if the connection is not detected, to an ordinary mode for infrared communication assuming ordinary spatial transmission (1 m).

It should be noted that the double speed mode switch 344 is used, in the strict sense, for detecting the connection, and for this reason a switch signal SW obtained by detecting the connection is supplied to the LSI 341. Accordingly, a unit for actually controlling operations in the double speed mode or in the ordinary mode is the LSI 341.

Signal lines for sending transmitting/receiving signals therethrough are provided in a space between the LSI 341 and the optical module 342. Sent through the signal lines are a receiving signal RX from the optical module 342 to the LSI 341 and an transmitting signal TX from the LSI 341 to the optical module 342. It should be noted that the LSI 341 provides controls for infrared communications in a half-duplex system.

The optical communication unit according to Embodiment 3 executes half-duplex communication, so that the need for a shielding plate for optically separating lights from each other is eliminated as far as the configuration is concerned, but the operations are executed in the same manner as that in Embodiment 1, and when communications between the apparatus-side communication unit and the cable-side communication unit are executed in two directions, infrared communications are executed based on the half-duplex system where transmission is executed in one direction and reception is executed in the other direction.

As described above, with Embodiment 3, a pair of cable-side communication units are connected to each other through an optical fiber cable, and infrared communications between units each in which the cable-side communication unit and the apparatus-side communication unit are directly connected to each other are controlled to a double speed based on the half-duplex system by using the optical module obtained by integrating the light receiving/emitting elements, so that contact communication based on the half-duplex system through a specified short distance between the communication units can be realized regardless of the length of the optical fiber cable, which enables high-speed optical communication and spatial efficiency on the whole is improved according to minimization of the optical module.

For this reason, optical power for executing infrared communication is sufficient only with energy suitable for the contact communication, so that it is possible to realize reduction of optical power and increase of a communication speed with the best balance therebetween by improving the efficiency of using energy appropriate for contact communication based on the half-duplex system.

Although the light receiving/emitting element is provided also in the cable-side communication unit in Embodiment 1, like Embodiment 4 described below, converging lenses in place of the light receiving/emitting elements may be provided in the cable-side communication unit. It should be noted that the whole configuration thereof is the same as that in Embodiment 1 (Refer to FIG. 1), so that description is made hereinafter only for different points from the configuration in Embodiment 1.

Figure 7:
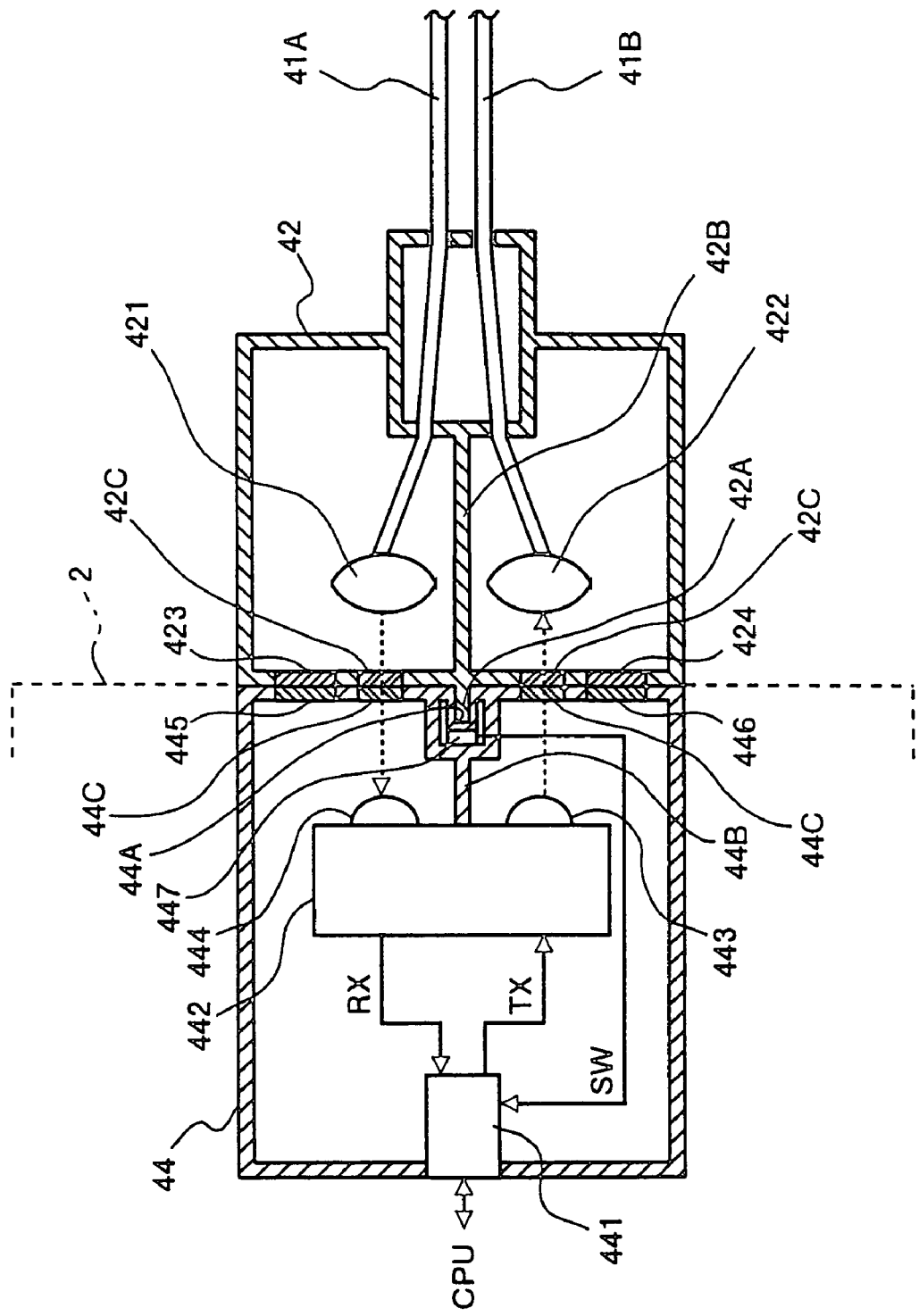
FIG. 7 is a cross-sectional view showing internal configuration of an optical communication unit according to Embodiment 4 of the present invention.

Description is made only for internal configuration of each of communication units in Embodiment 4. FIG. 7 is a cross-sectional view showing internal configuration of an optical communication unit according to Embodiment 4 of the present invention. The description herein also assumes an example of connection between a cable-side communication unit and an apparatus-side communication unit in the personal computer 2.

A cable-side communication unit 42 has a frame thereof formed in a box form, and converging lenses 421, 422 connected to each end of optical fiber cables 41A, 41B respectively and provided inside the frame. Optical filters 42C each for cutting off a visual light of an optical signal and letting pass therethrough only an infrared ray having a frequency higher than that of the visual light are provided on the contact surface with an apparatus-side communication unit 44 which is a communication unit as a partner in the frame of the cable-side communication unit 42.

Provided on the contact surface are magnets 423 and 424 each in adjacent to the optical filter 42C respectively. Those magnets 423, 424 are used for being magnetically connected to metallic portions provided on the contact surface of the apparatus-side communication unit 44 as a partner.

Each of the converging lenses 421, 422 emits a light and receives a light in place of the LED chip 124 and PD chip 126 in Embodiment 1 respectively. Provided in a space area in the cable-side communication unit 42 where the converging lenses 421, 422 are present is a shielding plate 42B for optically shielding a light (infrared ray) emitted from the converging lens 421 against a light (infrared ray) received by the converging lens 422. This shielding plate 42B is provided for realizing simultaneous optical communications in two directions, namely full duplex communication.

Provided on a portion of the contact surface which the shielding plate 42B strikes is a projecting section 42A in the cable-side communication unit 42. This projecting section 42A is a portion for engaging a concave section 44A provided on the contact surface of the apparatus-side communication unit 44 as a partner.

The apparatus-side communication unit 44 has a frame thereof formed in a box form. An LSI 441 electrically connected to the CPU of the personal computer 2 and an optical module 442 electrically connected to this LSI 441 are provided inside the frame. The LSI 441 provides controls for double speed communications in a state of connection of the communication unit 44 to the cable-side communication unit 42 as a partner. The optical module 442 has an LSI (not shown in the figure) for functioning infrared communications with the apparatus-side communication unit 44 as well as with the other side of cable-side communication unit provided inside the module.

Provided on the contact surface with the cable-side communication unit 42 which is a communication unit as a partner in the frame of the apparatus-side communication unit 44 are optical filters 44C each for cutting off a visual light of an optical signal and letting pass therethrough only an infrared ray having a frequency higher than that of the visual light. Provided next to the optical filters 44C on the contact surface are also iron plate members 445 and 446 to which the magnets 423 and 424 of the cable-side communication unit 42 as a partner are connected respectively.

Incorporated in the optical module 442 are an LED chip as a light emitting element and a PD chip as a light receiving element which are not shown in the figure, and an LED lens 443 for emitting a light by the LED chip and a PD lens 444 for receiving a light by the PD chip are provided therein at positions opposite to the optical filters 44C respectively.

In the apparatus-side communication unit 44, provided in a space area where the LED lens 443 and the PD lens 444 for the optical module 442 are present is a shielding plate 44B for optically shielding a light (infrared ray) emitted from the LED lens 443 against a light (infrared ray) received by the PD lens 444. This shielding plate 44B is provided for realizing simultaneous optical communications in two directions, namely full duplex communication. Then, in the apparatus-side communication unit 44, the concave section 44A for being engaged by the projecting section 42A of the cable-side communication unit 42 as a partner is provided on a portion of the contact surface which the shielding plate 44B strikes.

Further, a switch circuit for detecting connection between engaged units is provided in the engaged section between the projecting section 42A and the concave section 44A. Namely, this switch circuit is a double speed mode switch 447 for switching to a double speed mode to execute double-speed infrared communication when the cable-side communication unit 42 and the apparatus-side communication unit 44 are connected to each other. It should be noted that this double speed mode switch 447 switches, if the connection is not detected, to an ordinary mode for infrared communication assuming ordinary spatial transmission (1 m).

It should be noted that the double speed mode switch 447 is used, in the strict sense, for detecting the connection, and for this reason a switch signal SW obtained by detecting the connection is supplied to the LSI 441. Accordingly, a unit for actually controlling operations in the double speed mode or in the ordinary mode is the LSI 441.

Signal lines for sending transmitting/receiving signals therethrough are provided in a space between the LSI 441 and the optical module 442. Sent through the signal lines are a receiving signal RX from the optical module 442 to the LSI 441 and an transmitting signal TX from the LSI 441 to the optical module 442.

It should be noted that the operations in Embodiment 4 are the same as those in Embodiment 1, so that description thereof is omitted herein. There are some different points therefrom in which optical communications between a pair of cable-side communication units are executed by using the converging lenses 421, 422 because an optical module is not provided in the cable-side communication unit 42, and in which a communication speed depends on that of the apparatus-side communication unit as a partner.

As described above, with Embodiment 4, a pair of cable-side communication units are connected to each other through optical fiber cables, and infrared communications between units each in which the cable-side communication unit having converging lenses and an apparatus-side communication unit having light receiving/emitting elements are directly connected to each other are controlled to a double speed based on the full duplex system, so that distant communication such that an optical fiber cable is more than 40 m is possible regardless of the length of the optical fiber cable which enables high-speed optical communication, and it is also possible to realize contact communication based on the full duplex system through a specified short distance between the communication units even if converging lenses are applied in the cable-side communication unit.

For this reason, optical power for executing infrared communication is sufficient only with energy suitable for the contact communication, so that it is possible to realize reduction of optical power and speed-up of a communication speed with the best balance therebetween by improving the efficiency of using energy appropriate for contact communication based on the full duplex system. In addition, other effects are the same as those in Embodiment 1.

Although the light receiving/emitting elements are provided also in the cable-side communication unit in Embodiment 2, like Embodiment 5 described below, converging lenses in place of the light receiving/emitting elements may be provided in the cable-side communication unit. It should be noted that the whole configuration thereof is the same as that in Embodiment 1 (Refer to FIG. 1), so that description is made hereinafter only for different points from the configuration in Embodiment 1.

Figure 8:
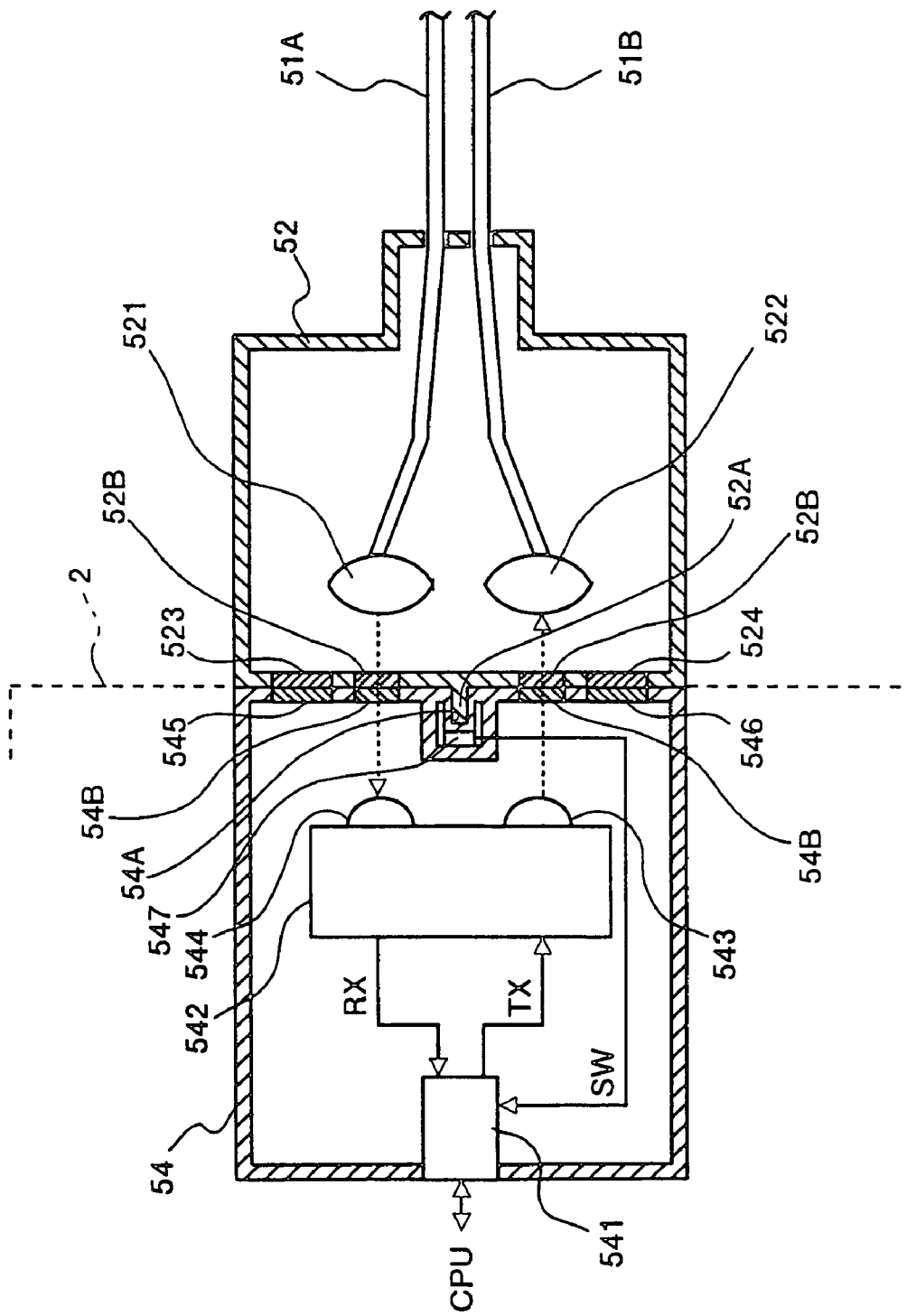
FIG. 8 is a cross-sectional view showing internal configuration of an optical communication unit according to Embodiment 5 of the present invention.

Description is made only for internal configuration of each of communication units in Embodiment 5. FIG. 8 is a cross-sectional view showing internal configuration of an optical communication unit according to Embodiment 5 of the present invention. The description herein also assumes an example of connection between a cable-side communication unit and an apparatus-side communication unit in the personal computer 2.

A cable-side communication unit 52 has a frame thereof formed in a box form, and converging lenses 521, 522 connected to each end of optical fiber cables 51A, 51B, respectively provided inside the frame. Optical filters 52B each for cutting off a visual light of an optical signal and letting pass therethrough only an infrared ray having a frequency higher than that of the visual light are provided on the contact surface with an apparatus-side communication unit 54 which is a communication unit as a partner in the frame of the cable-side communication unit 52.

Provided on the contact surface are magnets 523 and 524 in adjacent to the optical filters 52B respectively. Those magnets 523, 524 are used for being magnetically connected to metallic portions provided on the contact surface of the apparatus-side communication unit 54 as a partner.

Each of the converging lenses 521, 522 emits a light and receives a light in place of the LED chip 124 and PD chip 126 in Embodiment 1 respectively. In the cable-side communication unit 52, there is not provided the shielding plate 42B for optically shielding a light as shown in Embodiment 4 in a space area where the converging lenses 521, 522 are present. With this feature, it is possible to realize optical communications in two directions each for one-directional communication, namely half-duplex communication.

Provided on the same position (contact surface) as that where the projecting section 42A is provided in Embodiment 4 is a projecting section 52A having the same function in the cable-side communication unit 52. This projecting section 52A is a portion for engaging a concave section 54A provided on the contact surface of the apparatus-side communication unit 54 as a partner.

The apparatus-side communication unit 54 has a frame thereof formed in a box form. An LSI 541 electrically connected to the CPU of the personal computer 2 and an optical module 542 electrically connected to this LSI 541 are provided inside the frame. The LSI 541 provides controls for double speed communications in a state of connection of the communication unit 54 to the cable-side communication unit 52 as a partner. The optical module 542 has an LSI (not shown in the figure) for functioning infrared communications with the apparatus-side communication unit 54 as well as with the other side of cable-side communication unit provided inside the module.

Provided on the contact surface with the cable-side communication unit 52 which is a communication unit as a partner in the frame of the apparatus-side communication unit 54 are optical filters 54B each for cutting off a visual light of an optical signal and letting pass therethrough only an infrared ray having a frequency higher than that of the visual light. Provided in adjacent to the optical filters 54B on the contact surface are iron plate members 545 and 546 to which the magnets 523 and 524 of the cable-side communication unit 52 as a partner are connected respectively.

Incorporated in the optical module 542 are an LED chip as a light emitting element and a PD chip as a light receiving element which are not shown in the figure, and an LED lens 543 for emitting a light by the LED chip and a PD lens 544 for receiving a light by the PD chip are provided therein opposite to the optical filters 54B respectively.

In the apparatus-side communication unit 54, there is not provided the shielding plate 44B for optically shielding a light as Embodiment 4 has in a space area where the LED lens 543 and the PD lens 544 for the optical module 542 are present. With this feature, it is possible to realize optical communications in two directions each for one-directional communication, namely half-duplex communication. Then, in the apparatus-side communication unit 54, the concave section 54A for being engaged by the projecting section 52A of the cable-side communication unit 52 as a partner is provided like in Embodiment 2.

Further, a switch circuit for detecting connection between engaged units is provided in the engaged section between the projecting section 52A and the concave section 54A. Namely, this switch circuit is a double speed mode switch 547 for switching to a double speed mode to execute double-speed infrared communication when the cable-side communication unit 52 and the apparatus-side communication unit 54 are connected to each other. It should be noted that this double speed mode switch 547 switches, if the connection is not detected, to an ordinary mode for infrared communication assuming ordinary spatial transmission (1 m).

It should be noted that the double speed mode switch 547 is used, in the strict sense, for detecting the connection, and for this reason a switch signal SW obtained by detecting the connection is supplied to the LSI 541. Accordingly, a unit for actually controlling operations in the double speed mode or in the ordinary mode is the LSI 541.

Signal lines for sending transmitting/receiving signals therethrough are provided in a space between the LSI 541 and the optical module 542. Sent through the signal lines are a receiving signal RX from the optical module 542 to the LSI 541 and an transmitting signal TX from the LSI 541 to the optical module 542.

It should be noted that the operations in Embodiment 5 are the same as those in Embodiment 2, so that description thereof is omitted herein. There are some different points therefrom in which optical communications between a pair of cable-side communication units are executed by using the converging lenses 521, 522 because an optical module is not provided in the cable-side communication unit 52, and in which a communication speed depends on that of the apparatus-side communication unit as a partner.

As described above, with Embodiment 5, a pair of cable-side communication units are connected to each other through optical fiber cables, and infrared communications between units each in which the cable-side communication unit having converging lenses and an apparatus-side communication unit having light receiving/emitting elements are directly connected to each other are controlled to a double speed based on the half-duplex system, so that it is possible to realize contact communication based on the half-duplex system through a specified short distance between the communication units even if converging lenses are applied in the cable-side communication unit regardless of the length of the optical fiber cable which enables high-speed optical communication.

For this reason, optical power for executing infrared communication is sufficient only with energy suitable for the contact communication, so that it is possible to realize reduction of optical power and speed-up of a communication speed with the best balance therebetween by improving the efficiency of using energy appropriate for contact communication based on the half-duplex system. In addition, other effects are the same as those in Embodiment 2.

Although description has been made for the example of the configuration in which the LED and PD are separated from each other to execute infrared communication in half-duplex system in Embodiment 5, like Embodiment 6 described below, the present invention is applicable to configuration in which the LED and PD are integrated for infrared communications based on a half-duplex system. It should be noted that the whole configuration thereof is the same as that in Embodiment 1 (Refer to FIG. 1), so that description is made hereinafter only for different points from the configuration in Embodiment 1.

Figure 9:
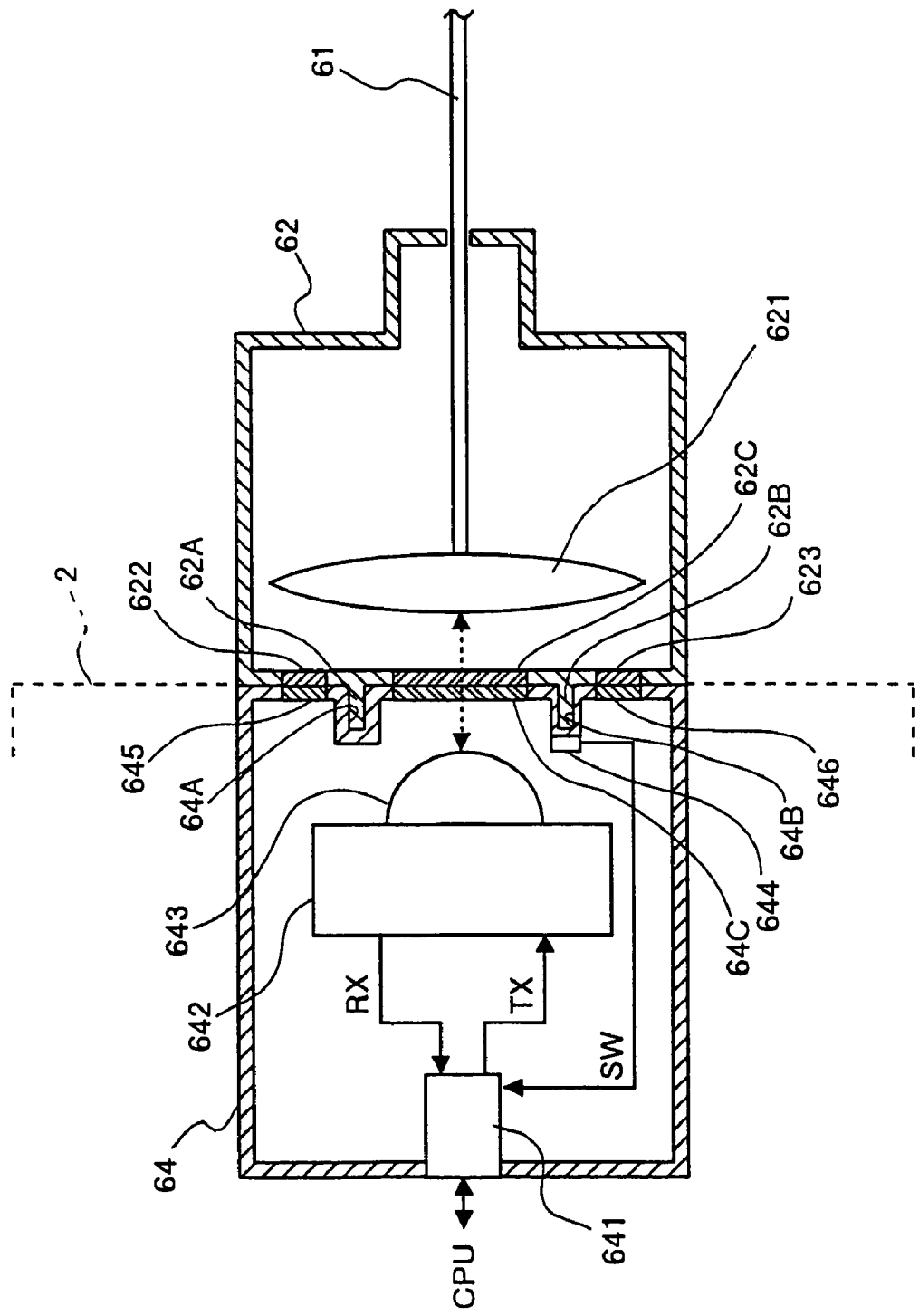
FIG. 9 is a cross-sectional view showing internal configuration of an optical communication unit according to Embodiment 6 of the present invention.

Description is made only for internal configuration of each of communication units in Embodiment 6. FIG. 9 is a cross-sectional view showing internal configuration of an optical communication unit according to Embodiment 6 of the present invention. The description herein also assumes an example of connection between a cable-side communication unit and an apparatus-side communication unit in the personal computer 2.

A cable-side communication unit 62 has a frame thereof formed in a box form, and a converging lens 621 connected to one end of an optical fiber cable 61 provided inside the frame. The converging lens 621 is obtained by integrating the converging lenses 521, 522 in Embodiment 5, and emits as well as receives a light with this single lens. An optical filter 62C for cutting off a visual light of an optical signal and letting pass therethrough only an infrared ray having a frequency higher than that of the visual light is provided on the contact surface with an apparatus-side communication unit 64 which is a communication unit as a partner in the frame of the cable-side communication unit 62.

Provided on the contact surface are magnets 622 and 623 each next to the optical filter 62C. Those magnets 622, 623 are used for being magnetically connected to metallic portions provided on the contact surface of the apparatus-side communication unit 64 as a partner.

Then, in the cable-side communication unit 62, different from the position where the projecting section 52A is provided in Embodiment 5, projecting sections 62A, 62B are provided at only two places adjacent to the periphery of the converging lens 621. Those projecting sections 62A, 62B are portions for engaging concave sections 64A, 64B respectively provided on the contact surface of the apparatus-side communication unit 64 as a partner.

The apparatus-side communication unit 64 has a frame thereof formed in a box form. An LSI 641 electrically connected to the CPU of the personal computer 2 and an optical module 642 electrically connected to this LSI 641 are provided inside the frame. The LSI 641 provides controls for double speed communications in a state of connection of the communication unit 64 to the cable-side communication unit 62 as a partner. The optical module 642 has an LSI (not shown in the figure) for executing infrared communications with the apparatus-side communication unit 64 as well as with the other side of cable-side communication unit provided inside the module.

Provided on the contact surface with the cable-side communication unit 62 which is a communication unit as a partner in the frame of the apparatus-side communication unit 64 is an optical filter 64C for cutting off a visual light of an optical signal and letting pass therethrough only an infrared ray having a frequency higher than that of the visual light. Provided in adjacent to the optical filter 64C on the contact surface are iron plate members 645 and 646 to which the magnets 622 and 623 of the cable-side communication unit 62 as a partner are connected respectively.

Incorporated in the optical module 642 is a light receiving/emitting chip obtained by integrating an LED chip as a light emitting element and a PD chip as a light receiving element which are not shown in the figure, and a light receiving/emitting lens 643 for receiving/emitting a light is provided therein at a position opposite to the optical filter 64C.

In the apparatus-side communication unit 64, there is not provided the shielding plate in a space area where the light receiving/emitting lens 643 for the optical module 642 is present. As described above, there is not provided a shielding plate, which enables realization of optical communications in two directions each for one-directional communication, namely half-duplex communication. Then, in the apparatus-side communication unit 64, the concave sections 64A, 64B for being engaged by the projecting sections 62A, 62B respectively are provided according to a positional relation between the projecting sections 62A, 62B located in the cable-side communication unit 62 as a partner.

Further, a switch circuit for detecting connection between engaged units is provided in either one of the engaged sections between the projecting sections 62A, 62B and the concave sections 64A, 64B. Namely, this switch circuit is a double speed mode switch 644 for switching to a double speed mode to execute double-speed infrared communication when the cable-side communication unit 62 and the apparatus-side communication unit 64 are connected to each other. It should be noted that this double speed mode switch 644 switches, if the connection is not detected, to an ordinary mode for infrared communication assuming ordinary spatial transmission (1 m).

It should be noted that the double speed mode switch 644 is used, in the strict sense, for detecting the connection, and for this reason a switch signal SW obtained by detecting the connection is supplied to the LSI 641. Accordingly, a unit for actually controlling operations in the double speed mode or in the ordinary mode is the LSI 641.

Signal lines for sending transmitting/receiving signals therethrough are provided in a space between the LSI 641 and the optical module 642. Sent through the signal lines are a reception signal RX from the optical module 642 to the LSI 641 and a transmission signal TX from the LSI 641 to the optical module 642. It should be noted that the LSI 641 provides controls for infrared communications in half-duplex system.

The optical communication unit according to Embodiment 6 executes half-duplex communication, so that the need for a shielding plate for optically separating lights from each other is eliminated as far as the configuration is concerned, but the operations are executed in the same manner as that in Embodiment 4, and when communications between the apparatus-side communication unit and the cable-side communication unit are executed in two directions, infrared communications are executed based on the half-duplex system where transmission is executed in one direction and reception is executed in the other direction.

As described above, with Embodiment 6, a pair of cable-side communication units are connected to each other through an optical fiber cable, and infrared communications between units each in which the cable-side communication unit having a converging lens and an apparatus-side communication unit having an optical module obtained by integrating a light receiving/emitting elements are directly connected to each other are controlled to a double speed based on the half-duplex system, so that it is possible to realize contact communication based on the half-duplex system through a specified short distance between the communication units even if a converging lens is applied in the cable-side communication unit regardless of the length of the optical fiber cable which enables high-speed optical communication, and spatial efficiency on the whole is improved according to minimization of the optical module.

For this reason, optical power for executing infrared communication is sufficient only with energy suitable for the contact communication, so that it is possible to realize reduction of optical power and speed-up of a communication speed with the best balance therebetween by improving the efficiency of using energy appropriate for contact communication based on the half-duplex system. In addition, other effects are the same as those in Embodiment 3.

Embodiment 7 of the present invention described hereinafter shows a particular case of arrangement of LEDs and PDs in the integrated configuration of LEDs and PDs according to Embodiment 3. Accordingly, in this Embodiment 7, an optical communication unit having the configuration according to Embodiment 3 described above is used, so that illustration as well as description thereof is omitted herein. Herein, description is made only for characteristic portions of this Embodiment 7.

At first description is made for an arrangement of LEDs and PDs corresponding to a light receiving/emitting section. Herein description is made for a light receiving/emitting section of a apparatus-side communication unit 34. FIGS. 10A and 10B are views showing an example of arrangement of a light receiving/emitting section in an optical communication unit according to Embodiment 7 of the present invention, and FIG. 10A and FIG. 10B are a side cross-sectional view and a front view each showing the light receiving/emitting section. The light receiving/emitting section in the apparatus-side communication unit 34 comprises an optical module 342 and a light receiving/emitting lens 343. In the optical module 342, as shown in FIG. 10A, a light receiving section (PD 348A for FIR, PD 349A for SIR) and a light emitting section (LED 350A for a long distance, LED 351A for a short distance) are coupled to each other, and the light emitting section and light receiving section are covered with the light emitting/receiving lens 343 having a curved form.

Arrangement of the light receiving/emitting section is shown in FIG. 10B. Namely, the LED 350A for a long distance and LED 351A for a short distance each constituting the light emitting section are positioned side by side in the vertical direction at a center of the light emitting/receiving lens 343. Also the PD 348A for FIR and PD 349A for SIR each constituting the light receiving section are positioned so that the light emitting section located at a center of the light emitting/receiving lens 343 will be held therebetween.

The LED 350A for a long distance and the LED 351A for a short distance are used case by case according to a communication distance or a communication mode. In other words, when a communication distance is long (for instance, 1 m) or in the case of space transmission mode, both of the LEDs are used, and when the communication distance is short (for instance, 50 cm), only the LED 351A for a short distance is used. Also the PD 348A for FIR and PD 349A for SIR are used case by case according to a communication speed. For instance, when light is received with a communication speed of up to 4 Mbps, the PD 348A for FIR and PD 349A for SIR are used, and when light is received with a communication speed of up to 115 kbps, only the PD 349A for SIR is used.

Figure 11:
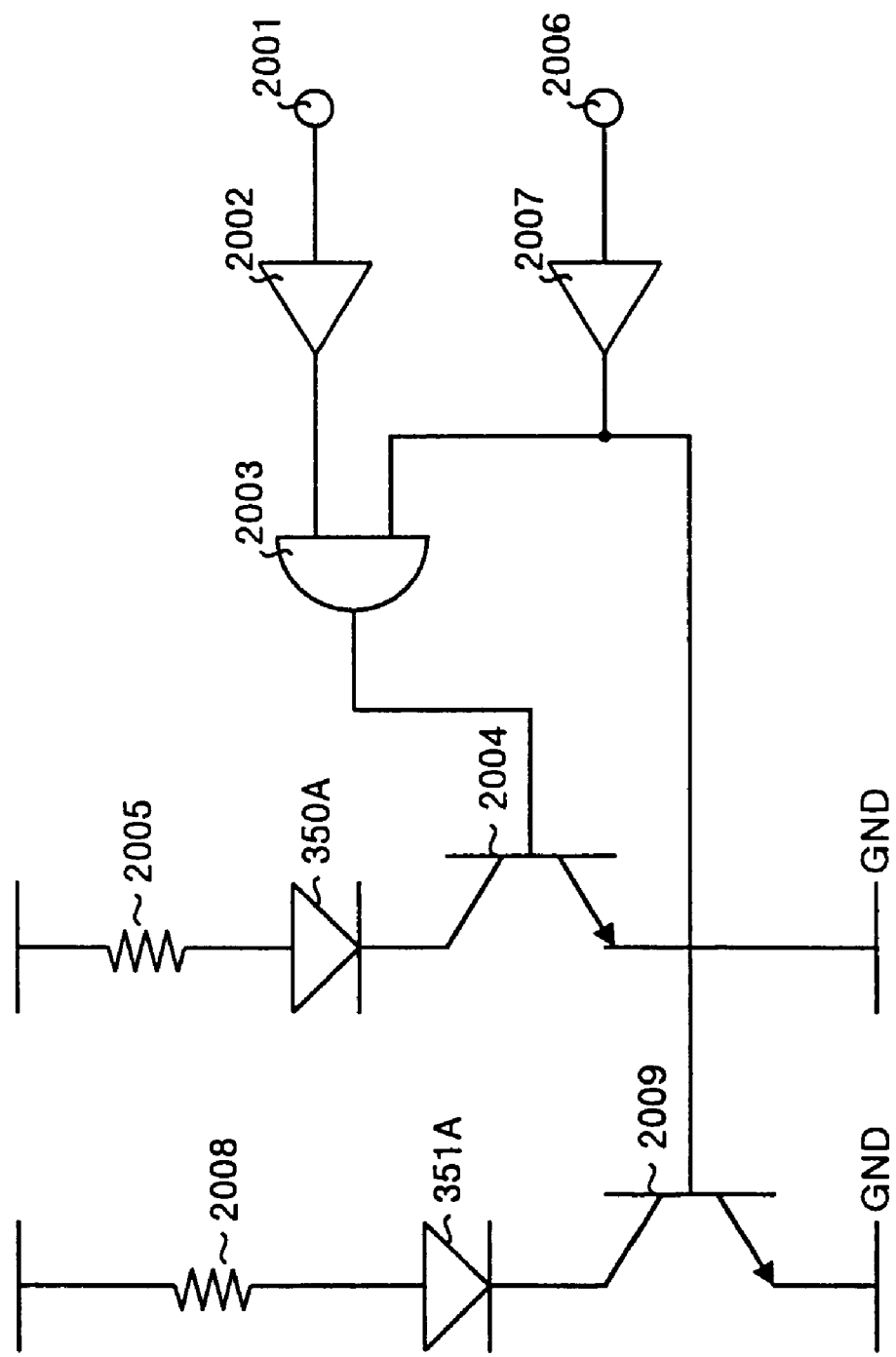
FIG. 11 is a circuit diagram showing one example of a LED control circuit according to Embodiment 7.

Next description is made for circuit configuration around the LED. FIG. 11 is a circuit diagram showing one example of the LED control circuit according to Embodiment 7. This LED control circuit is connected to a power control terminal 2001 and a transmission signal terminal 2006 of the LSI 347 described above. A signal for controlling a required power is inputted into the power control terminal 2001 according to the long transmission distance or the short transmission distance described above. For instance, when SW indicates the extremely short transmission distance communication mode, or when only the LED 351A for a short distance is used as in a case where a CPU issues an instruction for power saving, the LSI 347 responds to an instruction from the SW or CPU, and a power control signal of "0" is inputted into the power control terminal 2001. On the other hand, when both the LED 350A for a long transmission distance and the LED 351A for a short transmission distance are to be used like in a case where the SW indicates a space transmission or where the CPU issues an instruction for increase of a light-emission rate, the LSI 347 responds to an instruction from the SW or CPU, and a power control signal of "1" is inputted into the power control terminal 2001. Also a transmission signal (1/0) for light-emission by the LED is inputted into the transmission signal terminal 2006. It should be noted that, when the SW and CPU issues different signals respectively, the LSI 347 operates so that an instruction from the CPU is preferentially processed.

The LED 350A for a long transmission distance is connected via a resistor 2005 to a power supply unit (not shown) in the upstream side, and is connected to a collector of a transistor 2004 in the downstream side. In this transistor 2004, the emitter is grounded (GND), while the base is connected to an output terminal of an AND gate 2003. An amplifier 2002 for signal amplification and a transmission signal terminal 2006 each connected to the power control terminal 2001 are connected to an input terminal of the AND gate 2003. The AND gate 2003 provides controls over ON/OFF output to the base terminal according to a logical product between input from the transmission signal terminal 2006 and input from the power control terminal 2001.

Also the LED 351A for a short transmission distance is connected via a resistor 2008 to a power supply unit (not shown) in the upstream side, and is connected to a collector of a transistor 2009 in the downstream side. In this transistor 2009, the emitter is grounded (GND), while the base is connected to an amplifier 2007 for signal amplification connected to the transmission signal terminal 2006.

In the LED control circuit described above, when a power control signal of "1" is inputted into the power control terminal 2001, an ON/OFF signal is inputted into a base terminal from the AND gate 2003 to a base terminal of the transistor 2004 according to change to 1 or 0 of the transmission control signal inputted to the transmission signal terminal 2006. Namely, when the ON signal is inputted, a current flows between a collector and an emitter of the transistor 2004 with the LED 350 for a long transmission distance turned ON (emitting light), and when the OFF signal is inputted, a current flowing between a collector and an emitter of the transistor 2004 is cut with the LED 350A for a long transmission distance turned OFF.

At the same time, also a transistor 2009 is turned ON or OFF according to change of a transmission signal to 1 or 0. Namely, when the transmission signal is ON, a current flows between a collector and an emitter of the transistor 2009 with the LED 351A for a short transmission distance turned ON, and when the transmission signal is OFF, the current flowing between a collector and an emitter of the transistor 2009 is cut with the LED 351A for a short transmission distance turned OFF. With this feature, light emission with strengthened power by both the LED 350A for a long transmission distance and LED 351A for a short transmission distance is controlled for transmission over a long distance.

On the other hand, when the power control signal of "0" is inputted into the power control terminal 2001, no signal is inputted from the AND gate 2003 to a base terminal of the transistor 2004 during the period with the LED 350A for a long transmission distance set in the OFF state, and only the LED 351A for a short transmission distance turns ON or OFF according to a transmission signal. With this feature, light emission with suppressed power only by the LED 351A for a short transmission distance is controlled for transmission over a short distance.

Figure 12:
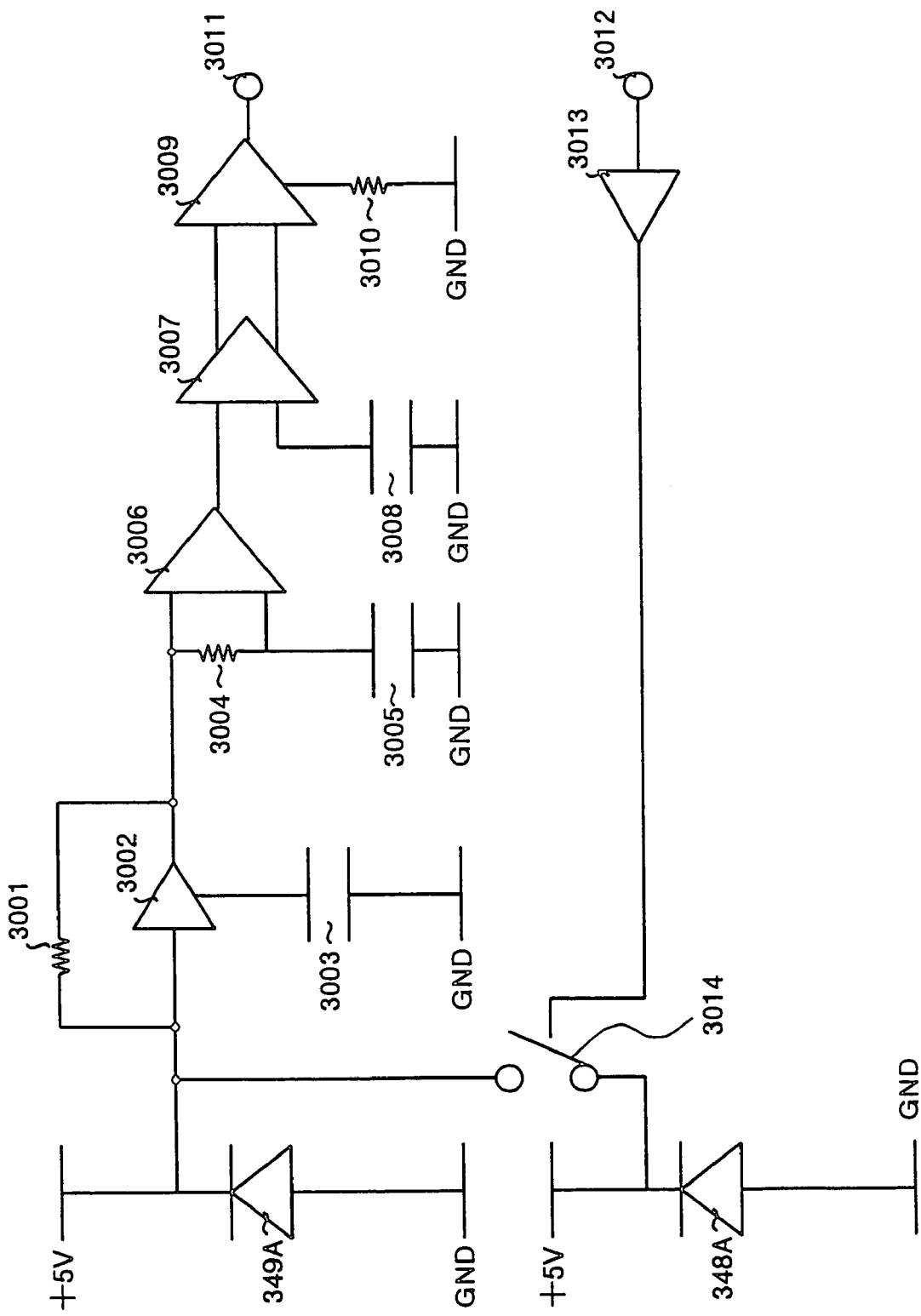
FIG. 12 is a circuit diagram showing an example of a PD control circuit according to Embodiment 7.
Figure 16:
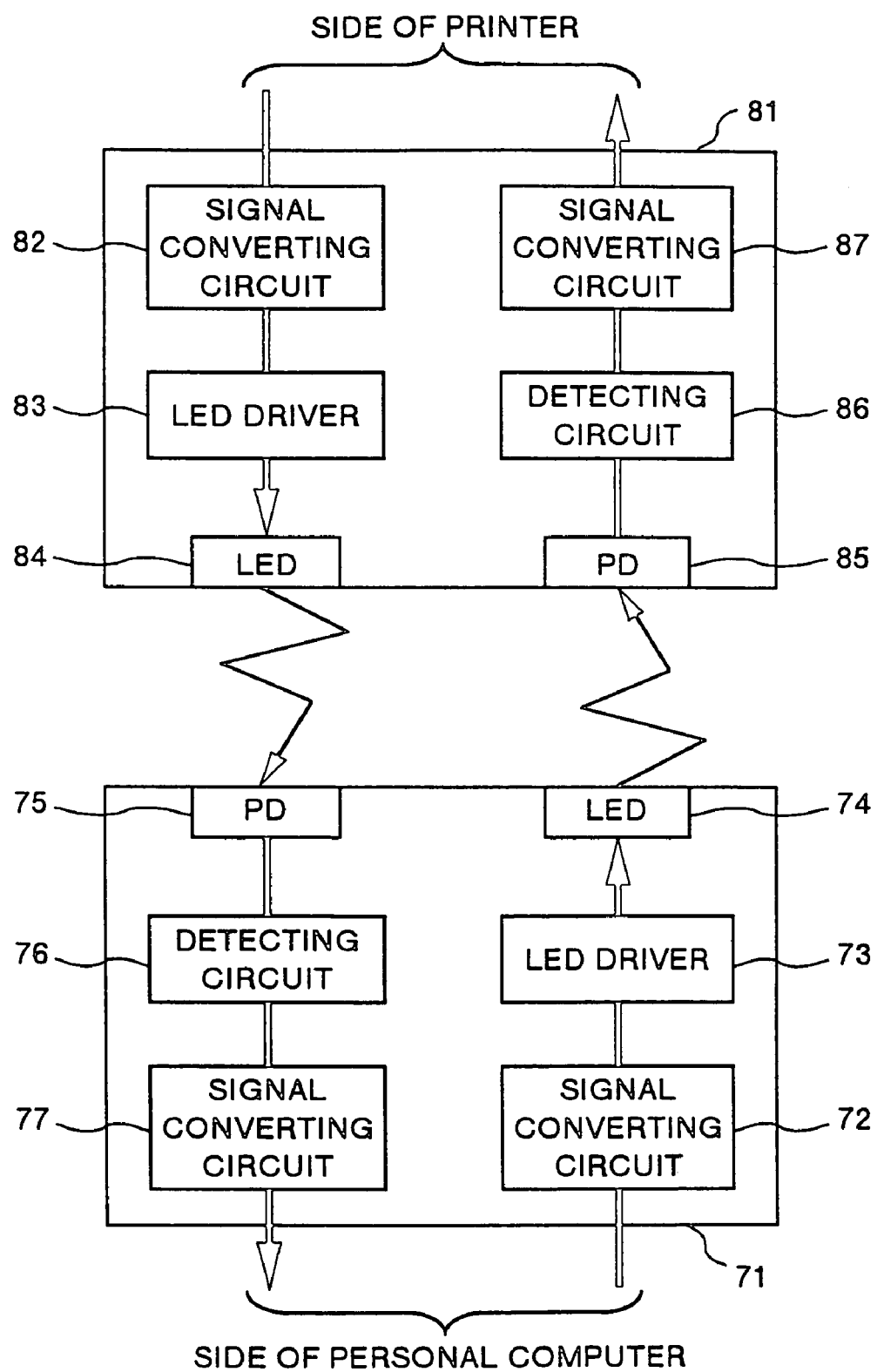
FIG. 16 is a block diagram showing internal con figuration of the optical communication unit based on the conventional technology.

Next description is made for circuit configuration around the PD. FIG. 12 is a circuit diagram showing one example of a PD control circuit according to this Embodiment 7. This PD control circuit is connected to a speed control terminal 3012 and a receiving signal terminal 3011 of the LSI 347 described above. A switch signal for controlling a receiving speed to that adapted to the SIR or FIR described above is inputted to the speed control terminal 3012. For instance, when only the PD 349A for SIR is used, the signal of "0" is inputted into the speed control terminal 3012, and when both the PD 349A for SIR and PD 348A for FIR are to be used, the signal of "1" is inputted into the speed control terminal 3012.

The PD 348A for FIR is connected to a switch 3014. This switch 3014 provides for switching to superimpose a signal received by the PD 349A for SIR over that received by the PD 348A for FIR. When a switch signal (amplified by an amplifier 3013) inputted from the speed control terminal 3012 is "1" this switch 3014 turns ON, and superimposes a signal received by the PD 348A for FIR and over that received by the PD 349A for SIR.

Provided between the PD 349A for SIR and a receiving signal terminal 3011 are, for instance, three stages of signal amplifying block. In the direction from the PD 349A for SIR to the receiving signal terminal 3011, the first stage of signal amplifying block comprises a amplifying return resistor 3001, an amplifier 3002, and a capacitor 3003 (GND); the second stage of signal amplifying block comprises an amplifying return resistor 3004, an amplifier 3006, and a capacitor 3005 (GND); and the third stage of signal amplifying block comprises an amplifier 3007, and a capacitor 3008 (GND). A comparator 3009 and a resistor 3010 are connected to a rear section of this third stage of signal amplifying block, so that only a receiving signal at a prespecified level is outputted to the receiving signal terminal 3011.

With the PD control circuit as described above, when a switch signal of "0" is inputted into the speed control terminal 3012, the switch 3014 is kept in the OFF state with the PD 348A for SIR not superimposed over a signal received by the PD 349A for FIR, and only the PD 349A for SIR is used for receiving a signal. In this case, only a signal received by the PD 349A for SIR is amplified through the three stages of signal amplifying block. If this amplified signal is at the prespecified level or higher in the comparator 3009, the signal is outputted as a correctly received signal from the receiving signal terminal 3011 to the LSI 347.

When the switch signal of "1" is inputted into the speed control terminal 3012, the switch 3014 turns ON with a signal received by the PD 349A for FIR superimposing over that received by the PD 348A for SIR. This superimposed signal is amplified through the three stages of signal amplifying block in the downstream side. If this amplified signal is at a prespecified level or higher in the comparator 3009, the signal is outputted as a correctly received signal from the receiving signal terminal 3011 to the LSI 347.

It should be noted that a power control signal supplied from the LSI 347 to the LED control circuit and a switch signal supplied to the PD control circuit are decided by means of connection to a partner device or through the communication protocol. Accordingly, if transmission over a long transmission distance is decided, the power control signal is inputted as "1", and when transmission over a short transmission distance is decided, the power control signal is inputted as "0". If use of SIR is decided, the switch signal is inputted as "0", and if use of FIR is decided, the switch signal is inputted as "1".

As described above, with this Embodiment 7 of the present invention, the light receiving/emitting section is minimized to the required minimum size and at the same time is covered with apiece of converging lens (light receiving/emitting lens), so that further size reduction can be realized as compared to that possible in other embodiments. Also by forming a surface of the light receiving/emitting lens with a loose inclination angle in a range from 30 degrees to 60 degrees for adapting to space transmission, communication with a broad angle can be executed, and restriction over the positional relation with a partner's light receiving/emitting section can be mitigated.

In the light receiving section (in the side of the PD), an available area thereof can be changed according to a communication speed of an optical signal, so that only an area most adapted to a communication speed of the optical signal may be used, and on the other hand, in the light emitting section (in the side of the LED), a circuit allowing change of a used area according to a transmission distance of an optical signal is provided, so that only an area most adapted to a transmission distance of an optical signal may be used. With this feature, power consumption can be made more efficient.

The example of arrangement of LEDs and PDs in Embodiment 7 described above is only an example thereof, and next description is made for there representative variants thereof.

FIGS. 13A and 13B are views showing an example of arrangement of alight receiving/emitting section in an optical communication unit according to Variant 1 of Embodiment 7 described above, and FIG. 13A and FIG. 13B are a side cross-sectional view and a front view each showing the light receiving/emitting section respectively. In this Variant 1, the light receiving/emitting section in the apparatus-side communication unit 34 comprises, as shown in FIG. 6, an optical module 342 and a light receiving/emitting lens 343. In the optical module 342, as shown in FIG. 13A, a light receiving section (PD 348B for FIR, PD 349B for SIR) and a light emitting section (LED 350B for a long transmission distance, LED 351B for a short transmission distance) are connected to the LSI 347, and the light emitting section and light receiving section are covered with a light receiving/emitting lens 343.

The positional relation in the light receiving/emitting section is shown in FIG. 13B. Namely, the LED 350B for a long transmission distance and LED 351B for a short transmission distance each constituting a light emitting section are provided side by side in the vertical direction at a center of the light receiving/emitting lens 343. Also the PD 348B for FIR and PD 349B for SIR each constituting the light receiving section are positioned so that the light emitting section located at a center of the light receiving/emitting lens 343 is held therebetween.

Thus, the same effect as that in Embodiment 7 described above can be achieved, even if a positional relation between LEDs and PDs is changed.

FIGS. 14A and 14B are views showing an example of arrangement of a light receiving/emitting section in an optical communication unit according to Variant 2 of Embodiment 7 described above, and FIG. 14A and FIG. 14B are a side cross-sectional view and a front view each showing the light receiving/emitting section. In this Variant 2, the light receiving/emitting section of the apparatus-side communication unit 34 comprises, as shown in FIG. 6, an optical module 342 and a light receiving/emitting lens 343. In the optical module 342, as shown in FIG. 14A, the light receiving section-(PD 348C) and light emitting section (LED 350C) are coupled to the LSI 347, and the light receiving section and light emitting section are covered with a light receiving/emitting lens 343 having a curved form.

Arrangement of the light receiving/emitting section is as shown in FIG. 14B. Namely, the LED 350C constituting the light emitting section and the PD 348C constituting the light receiving section are provided side by side in the horizontal direction at a center of the light receiving/emitting lens 343.

In this Variant 2, only one type of LEDs and one type of PDs are used, which makes it possible to realize more simple configuration of the light receiving/emitting section. The communication speed is not required to be differentiated for SIR and FIR, and the same effect as that in Embodiment 7 can be achieved excluding the point that communication can be executed without the necessity of power control for a long transmission distance or for a short transmission distance.

FIGS. 15A and 15B are views showing an example of arrangement of a light receiving/emitting section in an optical communication unit according to Variant 3 of Embodiment 7. FIG. 15A and FIG. 15B are a side cross-sectional view and a front view each showing the light receiving/emitting section. In this Variant 3, the light receiving/emitting section in the apparatus-side communication unit 34 comprises, as shown in FIG. 6, the optical module 342 and light receiving/emitting lens 343. In the optical module 342, as shown in FIG. 15A, the light receiving section (PD 348D) and light emitting section (LED 350D) are coupled to the LSI 347, and the light emitting section and light receiving section are covered with the light receiving/emitting lens 343 having a curved form.

Positional relation of the light receiving/emitting section is as shown in FIG. 15B. Namely, the PD 348D constituting the light receiving section and the LED 350D constituting the light emitting section are provided side by side in the vertical direction at a center of the light receiving/emitting lens 343.

Also in this Variant 3, as in Variant 2 described above, only one type of LEDs and one type of PDs are used, so that simpler configuration of the light receiving/emitting section can be realized. The communication speed is not required to be differentiated for SIR and FIR, and the same effect as that in Embodiment 7 can be achieved excluding the point that communication can be executed without the necessity of power control for a long transmission distance or for a short transmission distance.

Although the description has been made for the present invention with Embodiments 1 to 7, it is to be understood that various types of modification may be resorted without departing from the spirit and the scope of the present invention as claimed described below, and that those modifications are not to be excluded from the scope of the present invention.

As described above, with the optical communication unit according to the present invention, a driving force of a driving section which drives a light emitting section is changed in a control section according to an instruction from a switching section, which can give a change to an optical signal emitted by the light emitting section. For this reason, it is possible to obtain an optical communication unit which can achieve efficiency of using energy appropriate for desired optical communication.

With the optical communication unit according to the present invention, a quantity of light emitted by the light emitting section is changed as a driving force of the driving section, so that it is possible to obtain an optical communication unit which can reduce optical power by improving efficiency of using energy appropriate for desired optical communication.

With the optical communication unit according to the present invention, a transmission speed of an optical signal is changed as a driving force to the driving section, so that it is possible to obtain an optical communication unit which can make higher a communication speed by improving efficiency of using energy appropriate for desired optical communication.

With the optical communication unit according to the present invention, the switching section gives an instruction for switching a driving force to the control section when connection to an apparatus as a destination for transmission is detected, so that it is possible to obtain an optical communication unit in which ordinary optical communication is executed if the connection to the apparatus as a destination for transmission is not established and if the connection is established, a change in a quantity of light to reduce optical power or a change in a transmission speed to make higher a communication speed can be executed.

With the optical communication unit according to the present invention, the switching section gives an instruction for switching a driving force to the control section when connection between an apparatus as a destination for transmission and an optical cable unit is detected, so that it is possible to obtain an optical communication unit in which ordinary optical communication is executed if the connection between the apparatus as a destination for transmission and the optical cable unit is not established and if the connection is established, a change in a quantity of light to reduce optical power or a change in a transmission speed to make higher up a communication speed can be executed.

With the optical communication unit according to the present invention, connection is detected and a change instruction signal is outputted to the control section by a sensor in the switching section, so that it is possible to obtain an optical communication unit in which the switching section can surely obtain a timing of switching with its simple construction.

With the optical communication unit according to the present invention, connection is detected and an instruction for changing a driving force is outputted to the driving section by a hardware in the switching section, so that it is possible to obtain an optical communication unit in which the switching section can surely obtain a timing of switching with its simple construction.

With the optical communication unit according to the present invention, an optical signal is received by a light receiving section, so that it is possible to obtain an optical communication unit in which communication is not one-directional communication simply by emitting an optical signal, but duplex communication with infrared rays can be realized by receiving optical signals.

With the optical communication unit according to the present invention, the light receiving section and the light emitting section are covered with a same lens, so that it is possible to obtain an optical communication unit in which accuracy as duplex communication can be insured so far as a quantity of light and a transmission speed are provided under the same condition.

With the optical communication unit according to the present invention, a visual light is cut off by an optical filter on a light path to the light emitting section as well as to the light receiving section, so that it is possible to obtain an optical communication unit in which sufficient optical communication can be realized by receiving and emitting only an infrared ray having a frequency higher than that of the visual light.

With the optical communication unit according to the present invention, incidence of an optical signal from the light emitting section to the light receiving signal is prevented by a shielding section inside the optical communication unit provided in an apparatus for executing communication using an optical signal, so that an emitted optical signal and a received optical signal are not interfered with each other with the shielding section provided therebetween, and for this reason it is possible to obtain an optical communication unit in which sufficient duplex communication can be realized.

With the optical communication unit according to the present invention, signals are transmitted to and received from an apparatus as a communicating partner via the optical cable unit, so that it is possible to obtain an optical communication unit in which a distance with the apparatus as a communicating partner can arbitrarily be set in a state where a distance for executing optical communications through the space is kept constant.

With the optical communication unit according to the present invention, a visual light is cut off by an optical filter on a light path to the light emitting section as well as to the light receiving section, so that it is possible to obtain an optical communication unit in which sufficient optical communication can be realized by receiving and emitting only an infrared ray having a frequency higher than that of the visual light.

With the optical communication unit according to the present invention, in a signal transmitting/receiving section connected to one end of an optical cable, optical transmission between the apparatus and the optical cable is executed by the light receiving section and the light emitting section at the edge section to the connected optical cable, so that it is possible to obtain an optical communication unit in which a communication timing between apparatuses can be maintained well regardless of a length of an optical cable.

With the optical communication unit according to the present invention, a cable has a pair of paths for transferring optical signals in different directions respectively, so that it is possible to obtain an optical communication unit in which duplex communication inside the cable can be realized.

With the optical communication unit according to the present invention, an optical signal from the light emitting section is prevented by a shielding section so that the signal does not enter the light receiving section, so that an emitted optical signal and a received optical signal are not interfered with each other with the shielding section provided therebetween, and for this reason it is possible to obtain an optical communication unit in which sufficient duplex communication can be realized.

With the optical communication unit according to the present invention, an optical signal from the apparatus is converged and outputted into the optical cable by a first converging lens in the light receiving section, and an optical signal transmitted through the optical cable is converged and sent to the apparatus by a second converging lens in the light emitting section, so that only a smaller number of components in the light receiving section and the light emitting section is required, and for this reason it is possible to obtain an optical communication unit of which whole configuration realizing transmission and reception of optical signals can be simplified and minimized.

With the optical communication unit according to the present invention, an optical signal transmitted by the apparatus is modulated or demodulated and sent into the optical cable by a first modulating/demodulating section in the light receiving section, and an optical signal transmitted via the optical cable is modulated or demodulated and sent into the apparatus by a second modulating/demodulating section in the light emitting section, so that it is possible to obtain an optical communication unit in which a desired communication speed can be obtained according to arrangement of a pulse width of an optical signal sent by the apparatus for modulation and demodulation of the signal.

With the optical communication unit according to the present invention, the light receiving section and the light emitting section are covered with a same lens, so that it is possible to obtain an optical communication unit in which accuracy as duplex communication can be insured so far as a quantity of light and a transmission speed are provided under the same condition.

With the optical communication unit according to the present invention, a circuit changing an available area according to a communication speed of an optical signal is provided in the light receiving section, so that only an area most adapted to a communication speed of the optical signal may be used, and with this feature there is provided the effect that an optical communication unit, which can make power consumption more efficient, can be obtained.

With the optical communication unit according to the present invention, a circuit changing an available area according to a transmission distance of an optical signal is provided in the light emitting section, so that only an area most adapted to a transmission distance of an optical signal may be used, and with this feature there is provided the effect that an optical communication unit, which can make power consumption more efficient, can be obtained.

With the optical communication unit according to the present invention, the light receiving section and light emitting section are integrated to each other, and the integrated light receiving/emitting section is covered with one piece of converging lens, so that the light receiving/emitting section is minimized, and with this feature there is provided the effect that an optical communication unit, which can be made further smaller as the entire unit, can be obtained.

With the optical communication unit according to the present invention, the light receiving section and the light emitting section comprise a single converging lens for converging an optical signal from the apparatus as well as from the optical cable, so that only a smaller number of components in the light receiving section and the light emitting section is required, and for this reason it is possible to obtain an optical communication unit of which whole configuration realizing transmission and reception of optical signals can be simplified and minimized.

This application is based on Japanese patent applications No. HEI 9-262544 and No. HEI 10-31332 filed in the Japanese Patent Office on Sep. 26, 1997 and Feb. 13, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cable-side optical communication unit connectable with an apparatus-side optical communication unit provided in an apparatus for executing communication with a communicating partner by using optical signals, the cable-side optical communication unit comprising:

a light emitting section to transmit an optical signal to said apparatus;

a light receiving section to receive an optical signal from said apparatus;

an optical module to house said light emitting section, said light receiving section, and an integrated circuit to execute communications with the apparatus-side optical communication unit, wherein the light emitting section is connected to one of a pair of optical fiber cables to transmit the optical signal from the optical fiber cable to the apparatus, and the light receiving section is connected to the other of the pair of optical fiber cables to transmit the optical signal from said apparatus to the optical fiber cable;

a first converging lens attached to said optical module, to converge the optical signal transmitted by said light emitting section and to transmit the converged optical signal to said apparatus;

a second converging lens attached to said optical module, to converge the optical signal transmitted by said apparatus and to transmit the converged optical signal to said light receiving section;

a frame formed in a box form to contain said optical module, said first converging lens and said second converging lens;

a contact surface with said apparatus-side communication unit provided on said frame;

an optical filter provided on said contact surface to pass an infrared ray therethrough; and a shielding section to optically shield light between said first converging lens and said second converging lens, and to enable simultaneous bi-directional optical communication, wherein the first converging lens and the second converging lens are provided within said frame so as to face said optical filter, and said shielding section is provided within said frame.

2. An optical communication unit according to claim 1, further comprising:

a connecting section with an optical cable unit, wherein said optical communication unit transmits and receives optical signals to and from said apparatus via said optical cable unit.

3. An optical communication unit according to claim 1, further comprising:

an optical filter to cut off a visual light on a light path of the optical signal from said apparatus to said light receiving section, and the optical signal from said light emitting section to said apparatus.

4. An optical communication unit provided between two apparatuses that perform optical communication with each other, the optical communication unit transmitting and receiving optical signals to and from said apparatuses, the optical communication unit comprising:

a connector being connectable to any one of said apparatuses;

a signal transmitting/receiving section including a light receiving section to transmit an optical signal received from one of said apparatuses, and a light emitting section to transmit an optical signal transmitted from the other of said apparatuses to said one of said apparatuses;

an optical module to house said signal transmitting/receiving section such that the light emitting section is connected to one of a pair of optical fiber cables to receive the optical signal from the other of said apparatuses, and that the light receiving section is connected to the other of the pair of optical fiber cables to transmit the optical signal from said one of said apparatuses to the optical fiber cable, and the optical module including a first converging lens attached thereto to converge the optical signal transmitted by said light emitting section, a second converging lens attached thereto to converge the optical signal received at said light receiving section, and including at least one window to pass the optical signal from said one of said apparatuses to said light receiving section, and to pass the optical signal from said light emitting section to said one of said apparatuses;

a frame formed in a box form to contain said optical module, said first converging lens and said second converging lens and provided with the connector;

a contact surface provided on said frame; and an optical filter provided in the window, to cut off a visual light and to pass an infrared ray therethrough, wherein a shielding section is provided to optically shield light between said first converging lens and said second converging lens, and to realize full duplex communication, said at least one window and said connector are formed on said contact surface, the first converging lens and the second converging lens are provided within said frame so as to face said optical filter, and said shielding section is provided within said frame.

5. An optical communication unit according to claim 4, wherein the shielding section is provided to prevent incidence of an optical signal from said light emitting section to said light receiving section.

6. An optical communication unit according to claim 4, wherein the first converging lens converges an optical signal from said one of said apparatuses and transmits the optical signal to at least one of the pair of optical cables; and the second converging lens converges an optical signal transmitted through at least one of the pair of optical cables and transmits the optical signal to said one of said apparatuses.

7. An optical communication unit according to claim 4, wherein said light receiving section has a first modulating/demodulating section to receive an optical signal transmitted from said one of said apparatuses and convert the optical signal to an electric signal, and also to demodulate said electric signal to an optical signal and transmit the optical signal to at least one of the pair of optical cables; and said light emitting section has a second modulating/demodulating section to receive the optical signal transferred through at least one of the pair of optical cables and to convert the optical signal to an electric signal, and also to demodulate said electric signal to an optical signal and transmit the optical signal to said one of said apparatuses.

8. An optical communication unit according to claim 4, wherein said light receiving section has a circuit that changes an available area thereof according to a communication speed of an optical signal.

9. An optical communication unit according to claim 4, wherein said light receiving section has a circuit that changes an available area thereof according to a transmission distance of an optical signal.

10. An optical communication unit according to claim 4, wherein said light receiving section and said light emitting section are realized with one lens.

11. A cable-side optical communication unit connectable with an apparatus-side optical communication unit provided in an apparatus and having a light transceiver section to transmit/receive an optical signal to and from the apparatus for executing communication with a communication device, the cable-side optical communication unit comprising:

an optical module to house the light transceiver section and an integrated circuit to execute communications with the apparatus-side optical communication unit, and to execute communications with the other cable-side optical communication unit connected at other end of a pair of optical fiber cables, wherein the light transceiver section is connected to one of the pair of optical fiber cables to transmit the optical signal from the optical fiber cable to the apparatus, and the light transceiver section is connected to the other of the pair of optical fiber cables to transmit the optical signal from said apparatus to the optical fiber cable, and the integrated circuit executes bi-directional communications with the apparatus-side optical communication unit and the other cable-side optical communication unit;

a first converging lens attached to the optical module, to converge the optical signal transmitted by the light transceiver section and to transmit the converged optical signal to the apparatus;

a second converging lens attached to the optical module, to converge the optical signal transmitted by the apparatus and to transmit the converged optical signal to the light transceiver section;

a frame formed in a box form to contain said optical module, said first converging lens and said second converging lens;

a contact surface with said apparatus-side optical communication unit provided on said frame;

an optical filter provided on the contact surface to pass an infrared ray therethrough;

and a shielding section to optically shield light between said first converging lens and said second converging lens, and to enable simultaneous bi-directional optical communication, wherein the first converging lens and the second converging lens are provided within said frame so as to face said optical filter, and said shielding section is provided within said frame.

12. An optical communication unit provided between two apparatuses that perform optical communication with each other, the optical communication unit transmitting and receiving optical signals to and from said apparatuses, the optical communication unit comprising:

a signal transmitting/receiving section including a light receiving section to transmit an optical signal received from one of said apparatuses, and a light emitting section to transmit an optical signal transmitted from the other of said apparatuses to said one of said apparatuses;

a converging lens coupled to an optical cable and arranged in light paths of the optical signal from said one of said apparatuses to said light receiving section, and the optical signal from said light emitting section to said one of said apparatuses;

a frame formed in a box form to contain said signal transmitting/receiving section and said converging lens;

a contact surface with said one of said apparatuses provided on said frame; and an optical filter provided on said contact surface to pass an infrared ray therethrough, wherein said light receiving section and said light emitting section are integrated with each other, and said converging lens is provided within said frame so as to face said optical filter.

\* \* \* \* \*